(12) United States Patent
Nystad et al.

(10) Patent No.: US 9,092,345 B2
(45) Date of Patent: Jul. 28, 2015

(54) DATA PROCESSING SYSTEMS

(71) Applicant: ARM Limited, Cambridge (GB)

(72) Inventors: Jorn Nystad, Trondheim (NO); Andreas Engh-Halstvedt, Trondheim (NO)

(73) Assignee: ARM LIMITED, Cambridge (GB)

( * ) Notice: Subject to any disclaimer, the term of this patent is extended or adjusted under 35 U.S.C. 154(b) by 153 days.

(21) Appl. No.: 13/962,905

(22) Filed: Aug. 8, 2013

(65) Prior Publication Data

US 2015/0046655 A1    Feb. 12, 2015

(51) Int. Cl.
| G06F 12/08 | (2006.01) |
| G06F 9/30  | (2006.01) |
| G06F 9/38  | (2006.01) |
| G06T 1/20  | (2006.01) |
| G06T 1/60  | (2006.01) |

(52) U.S. Cl.
CPC .............. *G06F 12/0875* (2013.01); *G06T 1/60* (2013.01)

(58) Field of Classification Search
None
See application file for complete search history.

(56) References Cited

U.S. PATENT DOCUMENTS

| 5,742,785   | A  | 4/1998  | Stone         |
| 7,627,723   | B1 | 12/2009 | Buck et al.   |
| 8,108,610   | B1 | 1/2012  | Glasco et al. |
| 8,392,669   | B1 | 3/2013  | Nyland et al. |
| 2011/0154000 | A1 | 6/2011  | Fryman et al. |

FOREIGN PATENT DOCUMENTS

WO    WO2013100928 A1    7/2013

OTHER PUBLICATIONS

U.S. Appl. No. 13/913,334, filed Jun. 7, 2013.
Combined Search and Examination Report dated Dec. 5, 2014 in GB Patent Application No. GB1410064.8, 5 pages.
Ultra III: Implementaing a Scalable Shared-Memory Multiprocessor, The NYU Ultracomputer Project, 28 pages, at least by 1999. Available at: http://www.cs.nyu.edu/cs/projects/ultra/.
Evaluating the NYU Ultracomputer, The NYU Ultracomputer Project, 19 pages, at least by 1999. Available at: http://www.cs.nyu.edu/cs/projects/ultra/.
Susan R. Dickey and Richard Kenner, A Combining Switch for the NYU Ultracomputer, Courant Institute of Mathematical Sciences, New York University, 37 pages, Jun. 25, 1992, Available at http://citeseerx.ist.psu.edu/viewdoc/summary?doi=10.1.1.45.1778.

(Continued)

*Primary Examiner* — Kevin Verbrugge
(74) *Attorney, Agent, or Firm* — Vierra Magen Marcus LLP

(57) ABSTRACT

A data processing system includes one or more processors 4, 5, 6, 7 operable to initiate atomic memory requests for execution threads and plural data caches 8, 9, 10, 11 that are used to store data needed to perform an atomic memory operation when an atomic memory operation is to be performed.
When atomic operations are to be performed against a data cache, the results of atomic operations that are to access the same memory location are accumulated in a temporary cache line in the data cache pending the arrival in the cache of the "true" cache line from memory. The accumulated results of the atomic operations stored in the temporary cache line are then combined with the cache line from memory when the cache line arrives in the cache. Individual atomic values can also be reconstructed once the cache line arrives at the cache.

29 Claims, 11 Drawing Sheets

(56) References Cited

OTHER PUBLICATIONS

Allan Gottlieb and Clyde P. Kruskal, Coordinating parallel processors: a partial unification, Courant Institute of Mathematical Sciences, New York University, 16 pages (6 blanks, 5 of text, 5 of drawings), Sep. 1981, Available at http://archive.org/details/coordinatingpara00gott.

Benedict Gaster, German Andryeyev, Ofer Rosenberg, Aaftab Munshi, and Robert Elliott, Extension to the OenCL Programming Language for Atomic Counters, Version 5, 3 pages, May 26, 2011.

Office Action dated Mar. 2, 2015 in U.S. Appl. No. 13/913,334, 14 pages.

International Search Report and Written Opinion dated Feb. 13, 2015 in International Patent Application No. PCT/ GB2014/052427, 10 pages.

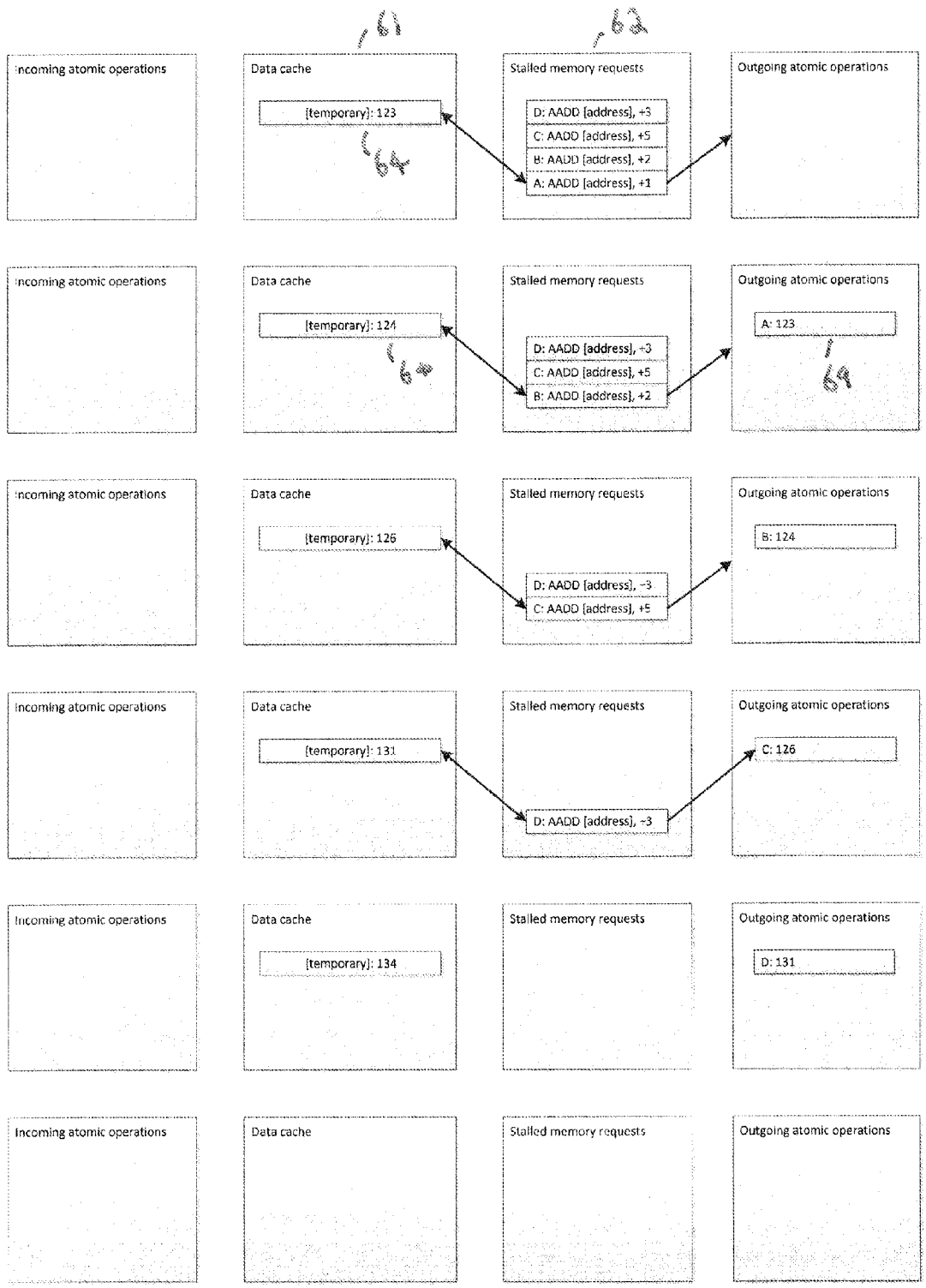

DATA PROCESSING SYSTEMS

BACKGROUND

The technology described herein relates to data processing systems, and in particular to the operation of graphics processing systems that include one or more programmable processing stages ("shaders").

As is known in the art, graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data (e.g. appropriately transformed and lit vertex data in the case of a vertex shader) for processing by the rest of the graphics pipeline and/or for output. The shaders of the graphics processing pipeline may share programmable processing circuitry, or they may each be distinct programmable processing units.

A graphics processing unit (GPU) shader core is thus a processing unit that performs graphics processing by running small programs for each graphics item in a graphics output to be generated such as a render target, e.g. frame (an "item" in this regard is usually a vertex or a fragment (pixel)). This generally enables a high degree of parallelism, in that a typical render output, e.g. frame, features a rather large number of vertices and fragments, each of which can be processed independently.

As is known in the art, a shader program to be executed by a given "shader" of a graphics processing pipeline will be provided by the application that requires the graphics processing using a high-level shader programming language, such as GLSL, HLSL, OpenCL, etc. This shader program will consist of "expressions" indicating desired programming steps defined in the relevant language standards (specifications). The high-level shader program is then translated by a shader language compiler to binary code for the target graphics processing pipeline. This binary code will consist of "instructions" which are specified in the instruction set specification for the given target graphics processing pipeline. The compilation process for converting the shader language expressions to binary code instructions may take place via a number of intermediate representations of the program within the compiler, as is known in the art. Thus the program written in the high-level shader language may be translated into a compiler specific intermediate representation (and there may be several successive intermediate representations within the compiler), with the final intermediate representation being translated into the binary code instructions for the target graphics processing pipeline.

It is common in modern graphics processing units to have instructions to perform "atomic" memory operations. An "atomic" memory operation is an operation sequence that reads a memory location, performs an arithmetic operation between the memory value and an operand value (typically a register value), and then writes the result of the arithmetic operation back to the same memory location. This sequence of operations is carried out so that to every observer, it looks as if the sequence has either not been performed at all, or been performed in its entirety. It is executed as one indivisible unit, hence the name "atomic".

The arithmetic operation that is performed as part of the atomic is usually a simple operation that is both commutative and associative. Common examples of such operations are: Integer Add; Bitwise AND, OR, XOR; Minimum Value; Maximum Value.

Other atomic operations that are common but not commutative are:

Swap (also know as Exchange)—the register value is written to the memory location and the old value of the memory location is then returned to the shader (this operation is associative);

Compare-And-Swap (Compare and Exchange)—two register values are provided, the memory value is compared to the first of them, and if they compare equal, then the second register value is written to the memory location (this operation is associative if the comparison value is held constant).

Atomic memory operations typically occur in two variants: "Return" and "NoReturn". The "Return" variants return back to the shader the datum that was present at the memory location before the "atomic" operation was performed. The "NoReturn" variants do not return any value back to the shader. Typically, in a GPU, all of the operations listed above are available in both variants (except Swap, which is not available in the NoReturn variant).

Typical examples of use-cases for GPU atomics include incremental memory allocators (Integer Add of the "Return" type), histograms (Integer Add of the "NoReturn" type) and bounding-box computation (Minimum/Maximum Value of the "NoReturn" type).

If multiple atomics are performed on the same memory location, they need to be serialized. This is necessary to maintain the observable semantic that each of them has been performed either in full or not at all. This can then cause throughput issues in systems with multiple data caches and a coherency protocol.

For example, in such an arrangement, a processing core wishing to perform atomic operations to a given memory location will first need to fetch from memory the cache line storing the data for the memory location in question into a line of its cache. Then, when the cache line is present in the cache, the atomic operations can be performed sequentially, one at a time, using the data in the cache line. However, while the cache line is resident in the cache of the core in question, other cores that use different caches and that require the data (the cache line) in question cannot perform their atomic operations, such that the atomic operations for those cores must be stalled until the cache line is released by the cache that currently has it (such that it can then be fetched into the cache of another core).

Thus, while a core is waiting for the cache line (i.e. the cache line is not present in its cache), the atomic operations for that core are stalled and cannot be performed at all. Similarly, when the cache line is travelling from one cache to another, no atomic operations can be performed on the data in the cache line at all.

This all has the effect that throughput of atomic operations to the same memory location in systems that use multiple caches can be relatively slow, as the processing core or cores have to wait for the cache line to travel to their respective caches before the atomic operations can be performed.

FIGS. 1 and 2 illustrate this operation.

FIG. 1 shows an exemplary data processing system that has four processing cores 40, 41, 42, 43 each with a respective level one (L1) cache 44, 45, 46, 47. Each processing core is capable of performing atomic operations, and when an atomic operation is to be performed to a given memory location, a cache line containing the data at that memory location is first loaded from a main memory 48 into a cache line in the respective level one cache of the core in question. As discussed above, if more than one of the processing cores 40, 41, 42, 43 is performing an atomic operation to the same location in the main memory 48, then the cache line from the main memory 48 will need to be loaded into the respective level one caches of the cores that need it in a serial fashion in order to maintain the necessary atomic operation semantics. This then has the effect that if the cache line is in a respective level one cache of one of the processing cores, any other processing core that requires that cache line must stall its atomic operations until the cache line is fetched into the cache for the core in question.

FIGS. 2A and 2B illustrate this operation and shows by way of example a set 50 of threads A, B, C, D that are to perform an atomic operation (which in this is case is an atomic ADD operation) for one of the processing cores 40. At the start of the process, the threads 50 to be executed are ready for execution by the core 40, but it assumed that the relevant cache line (data) from the main memory has not been fetched into the cache 41 for the processing core 40.

A request 57 is sent to fetch the relevant cache line into the cache 41 for the processing core 40. At the same time, space 58 for the fetched cache line is set aside in the cache 41 (but the cache line has not yet arrived).

Then, some time later the requested cache line 51 that contains the data at the memory location (address) in question arrives into the data cache 41 for the processing core 40. The first atomic operation 52 (for the thread A) is then executed. As shown in FIG. 2, the atomic operation for the thread A 52 is to increment the value in the memory address by one (+1), and so the value in the cache line 51 for the memory location in question is incremented by one (so to "124" in this case).

Thread A also returns the previous value 54 ("123" in this case) for the memory address to the processing core (as in this case it is assumed that the atomic operation is of the return type).

It is then assumed, as shown in FIG. 2A, that a snoop request 59 is made for the data in the cache line 51 (i.e. that another part of the system requests the data in the cache line 51), and that in response to this, the cache line 51 is evicted 33 from the data cache 41 for the processing core 40. The atomic operations for the threads B, C, D, must therefore be stalled as the data cache 41 for the processing core 40 no longer contains the relevant cache line. Thus, as shown in FIG. 2A, a further request 32 to fetch the cache line must be sent.

Then, once the relevant cache line arrives again in the data cache 41 for the processing core 40 in question, the next thread, thread B, executes its atomic add operation 53 to increment the value in the cache line for the memory address by two (+2), and also returns the previous value 56 (in this case "124") for the memory address to the processing core.

It is then assumed that again a snoop request causes the cache line to be evicted from the data cache 41 and so before the thread C can perform its atomic operation, a further fetch request and wait until the cache line arrives in the data cache 41 takes place.

Again once the cache line arrives in the data cache for the processing core, the next thread C can perform its atomic addition operation 55 and return its relevant output value, and so on for the thread D, as shown in FIG. 2B.

At the end of this operation, the cache line in the data cache 41 for the processing core 40 will store the accumulated result of the atomic operations, which can then be returned to main memory and/or passed to the cache for another core for that core to perform its atomic operations on the memory location in question.

It can be seen that in this operation, if a large number of snoop requests are received while the atomic operations are being performed, the throughput of the atomic operations can be considerably delayed.

The Applicants believe that there remains scope for improvements to the handling of atomic operations in systems that use multiple, e.g. L1, caches, for example in graphics processing pipelines that include one or more shader stages.

BRIEF DESCRIPTION OF THE DRAWINGS

A number of embodiments of the technology described herein will now be described by way of example only and with reference to the accompanying drawings, in which:

FIGS. 2A and 2B show conventional atomic operation processing in a data processing system having multiple data caches;

FIGS. 5A, 5B, and 5C, and 6A, 6B and 6C illustrate the operation of embodiments of the technology described herein.

Like reference numerals are used for like components where appropriate in the drawings.

DETAILED DESCRIPTION

Figure 1:
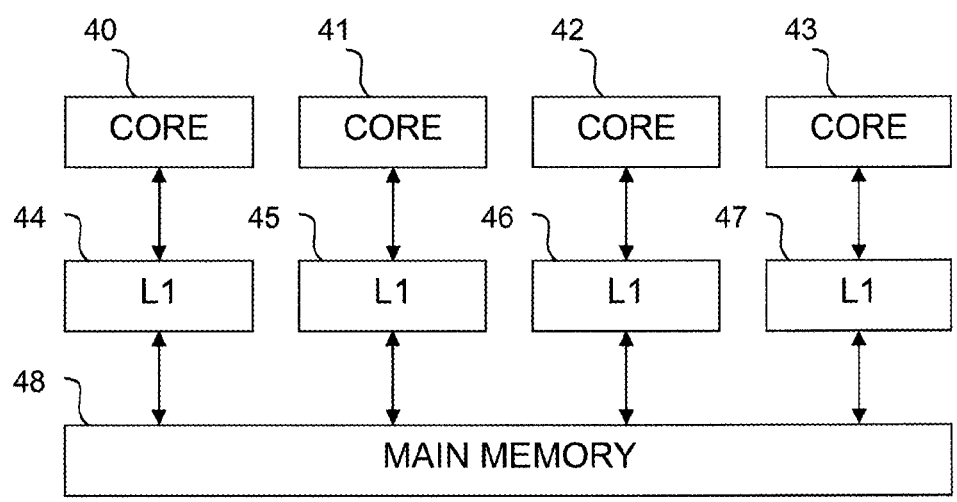
FIG. 1 shows an exemplary data processing system having multiple data caches.
Figure 2A:
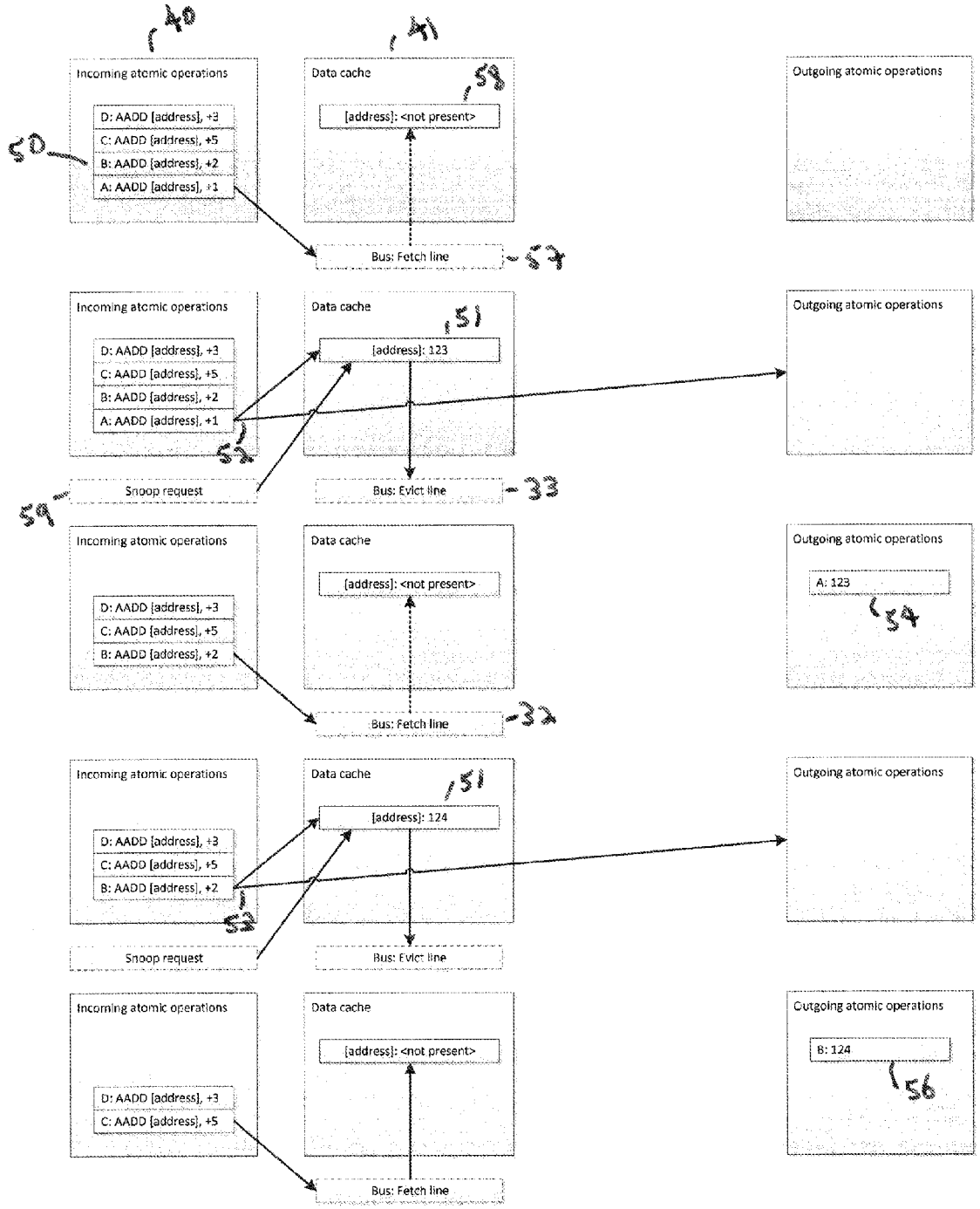
Figure 2A:
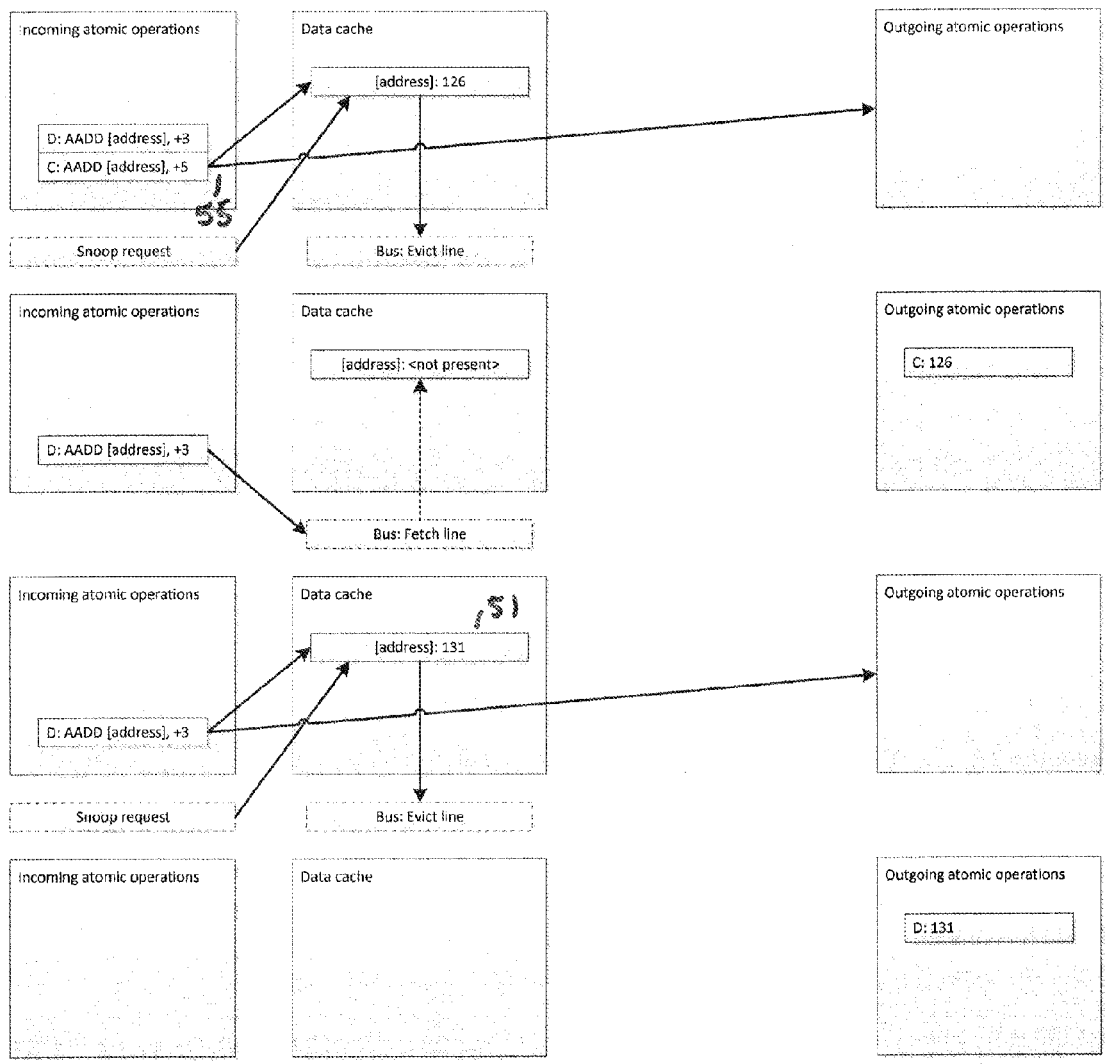

A first embodiment of the technology described herein comprises a method of operating a data processing system which includes one or more initiators operable to initiate atomic memory requests for execution threads and one or more data caches that are used to store data needed to perform an atomic memory operation when an atomic memory operation is to be performed, the method comprising:

for a set of one or more execution threads that are each to execute a particular atomic operation against the same memory address one after another, the atomic operation having an associated arithmetic operation:

prior to performing the atomic operation for the first thread in the set, determining whether the data cache that is to store the data needed to perform the atomic operation already stores the data at the memory address that the atomic operation is to be performed against, and if the data cache does not already store that data:

sending a memory request to fetch into the data cache a cache line containing a data item containing the data at the memory address that the atomic operation is to be performed against;

allocating a temporary cache line in the data cache for the atomic operation;

preparing the data items in the temporary cache line for the atomic operation;

causing the operand value to the arithmetic operation for the atomic operation for the first thread in the set to be stored in the data item for the memory address that the atomic operation is to be performed against in the temporary cache line;

if the set of one or more execution threads includes more than one thread, performing the atomic operation for one or more subsequent threads in the set against the data item for the memory address that the atomic operations are to be performed against in the temporary cache line in the data cache in turn, until the cache line containing the data at the memory address that the atomic operation is to be performed against arrives in the data cache; and when the cache line containing the data at the memory address that the atomic operation is to be performed against arrives in the data cache, performing the arithmetic operation for the atomic operation using the data item for the memory address in the temporary cache line as one operand and using the data item for the memory address in the arrived cache line as the other operand, to thereby provide a result data item containing the combined result of the atomic memory operations on the memory address that the atomic operation is to be performed against; and storing a result cache line containing the result data item.

A second embodiment of the technology described herein comprises a data processing system comprising:

one or more initiators operable to initiate atomic memory requests for execution threads;

and one or more data caches that are used to store data needed to perform an atomic memory operation when an atomic memory operation is to be performed;

wherein the one or more data caches are configured to, for a set of one or more execution threads that are each to execute a particular atomic operation against the same memory address one after another, the atomic operation having an associated arithmetic operation:

prior to performing the atomic operation for the first thread in the set, determine whether the data cache that is to store the data needed to perform the atomic operation already stores the data at the memory address that the atomic operation is to be performed against, and if the data cache does not already store that data:

send a memory request to fetch into the data cache a cache line containing a data item containing the data at the memory address that the atomic operation is to be performed against;

allocate a temporary cache line in the data cache for the atomic operation;

prepare the data items in the temporary cache line for the atomic operation;

cause the operand value to the arithmetic operation for the atomic operation for the first thread in the set to be stored in the data item for the memory address that the atomic operation is to be performed against in the temporary cache line;

if the set of one or more execution threads includes more than one thread, perform the atomic operation for one or more subsequent threads in the set against the data item for the memory address that the atomic operations are to be performed against in the temporary cache line in the data cache in turn, until the cache line containing the data at the memory address that the atomic operation is to be performed against arrives in the data cache; and when the cache line containing the data at the memory address that the atomic operation is to be performed against arrives in the data cache, perform the arithmetic operation for the atomic operation using the data item for the memory address in the temporary cache line as one operand and using the data item for the memory address in the arrived cache line as the other operand, to thereby provide a result data item containing the combined result of the atomic memory operations on the memory address that the atomic operation is to be performed against; and store a result cache line containing the result data item.

The technology described herein relates to the execution of atomic memory operations in data processing systems that have multiple data caches that store data from main memory to be used for atomic memory operations. In the technology described herein, when an atomic memory operation is to be performed, and the data for the atomic memory operation is not present in the data cache that the atomic memory operation is to be performed against, then rather than stalling the performance of the atomic memory operation until the data is present in the cache, a temporary cache line for the atomic operation is allocated in the cache, and the atomic memory operation is then performed against that temporary cache line pending the arrival of the desired "true" cache line in the cache. Furthermore, as will be discussed further below, multiple atomic operations of the same type can be performed against the temporary cache line. Then, when the cache line containing the data from the main memory is fetched into the cache, the temporary cache line and the incoming cache line (main memory data) are combined to provide the required output (result) for the atomic memory operation (i.e. merged to perform the atomic memory operation against the data in the address in memory in question).

As will be discussed further below, this effectively allows the atomic memory operations to be performed such that when the cache line containing the data for the memory location for the atomic operation arrives at the data cache, a set of accumulated atomic operations can be committed to the cache line at once (in a single clock cycle), whilst (as will be discussed further below) still fully retaining the semantics of the atomic operations. This then facilitates minimising the amount of time a cache line has to be present for a set of atomic memory operations to be performed. This can then significantly improve atomic memory operation performance, and lead to increased throughput for atomic memory operations in systems that have multiple data caches.

Also, because this operation in the manner of the technology described herein is performed at the level of the data cache, the technology described herein can require changes only to the operation at the data cache level in question, and does not require any changes to any other subsystem (e.g. lower cache levels, main memory operations, etc.) of the data processing system. For example, in a system that already supports coherent memory and atomics, the technology described herein can require only local changes to the, e.g. L1, cache, and any protocols that the, e.g. L1, cache uses for communicating with its master and with the main memory subsystem are unaffected by the use and presence of the technology described herein.

As will be discussed further below, the above steps are required for both no return and return atomics, but for return atomics further steps may be required (and are in an embodiment performed).

The initiators that can request atomic memory operations can comprise any suitable processor or processing unit. In an embodiment, they comprise respective processing cores. In an embodiment each initiator comprises a, in an embodiment programmable, execution stage of an execution pipeline that includes one or more, in an embodiment programmable, execution stages which execute instructions to perform data processing operations for execution threads.

As discussed above, it is believed that the technology described herein will have particular application in graphics processing systems. Thus the data processing system in an embodiment comprises a graphics processing system and the initiators in an embodiment comprise graphics processing pipelines, and/or execution stages of graphics processing pipelines, having execution stages in an embodiment in the form of one or more programmable graphics shading stages (shaders) which execute graphics shader programs to perform graphics processing operations. However, the technology described herein is equally applicable to other forms of data processing system, such as CPUs.

The technology described herein is applicable to the situation where there are multiple data caches that can store data for atomic memory operations. It can be used in the systems where there is a single initiator unit (e.g. GPU) that can perform atomic operations that has multiple data caches that can be used to store data for performing atomic operations, and/or it can be used in the situation where there are multiple initiator units (e.g. GPUs) each having their own respective data cache or caches to be used for storing data from main memory for performing atomic memory operations. In an embodiment, the data processing system has plural initiator units, each having a respective data cache.

The data caches may be any suitable data caches of the data processing system. In an embodiment they are level one (L1) caches. However, this is not essential, and the technology described herein could be implemented at other cache levels if desired (although all the data caches should be, and in an embodiment are, of the same level, so where the technology described herein is implemented in the level two caches of the data processing system, all the data caches are in an embodiment L2 caches).

The atomic memory operations that can be handled in the manner of the technology described herein may be any suitable and desired atomic memory operations. In an embodiment there is set of particular, selected atomic memory operations that will be handled in the manner of the technology described herein. In an embodiment, the atomic memory operations that will be handled in the manner of the technology described herein include atomic operations for which the arithmetic operation that is performed as part of the atomic is associative, and in an embodiment both commutative and associative. However, this is not essential and the technology described herein can also be used for other atomic operations, such as Swap (Exchange) and Compare-And-Swap (Compare-and-Exchange) that do not have these properties, if desired.

In an embodiment, the atomic memory operations that will be handled in the manner of the technology described herein comprise one or more of, and in an embodiment all of: Integer Add; Bitwise AND, OR, XOR; Minimum Value; Maximum Value; Saturating unsigned integer add; Integer multiply; floating-point add; floating point multiply; integer add, modulo a constant K.

The atomic memory operations that are handled in the manner of the technology described herein in an embodiment have an appropriate "identity value" (although as will be discussed below, this is not essential). This "identity value" is a value for the arithmetic operation for the atomic operation that will leave the value that the identity value is combined with for the arithmetic operation unchanged (i.e. such that if a given arithmetic operation is denoted with the operator %, then arithmetic operation's identity value is a value V such that for all possible input values X, V % X=X % V=X). Thus, for example, for an integer ADD operation the identity value is "0", for a bitwise OR or bitwise XOR operation, the identity value="0", for a bitwise AND, the identity value is an all ones bit vector, for a minimum value operation, the identity value is the largest representable number in the memory value's format, and for a maximum value operation, the identity value is the smallest representable number in the memory values' format (and so on).

Identity values for other atomic memory operations can be determined correspondingly.

The memory request to fetch into the data cache the cache line containing the data at the memory address that the atomic operation is to be performed against can be sent and configured as desired, e.g. depending on the memory system in question.

The temporary cache line can be allocated for the atomic operation in any desired and suitable manner, for example in accordance with the normal cache line allocation processes for the system and/or cache in question.

The temporary cache line in an embodiment has associated with it (is tagged with) one or more of, and in an embodiment all of: the appropriate memory address for the set of atomic operations; the fact it is a temporary cache line for the purposes of operation in the manner of the technology described herein; and the arithmetic operation for the atomic operations that it is to accumulate.

The temporary cache line in an embodiment can only be used for the accumulation of the appropriate atomic memory operations in question (i.e. that match the tag of the temporary cache line (the same atomic operation, the same memory address (or at least a memory address within the same cache line)), and in an embodiment cannot otherwise be read, written to, snooped, or in any other way interacted with. In other words, the temporary cache line is in an embodiment configured such that for all other purposes than the particular subset of atomic operations it is intended to handle, it effectively is not visible to the system (does not "exist").

In an embodiment, the "atomic-operation" that is used to tag the temporary cache line distinguishes, at least for selected atomic operations, not only on the type of arithmetic operation to be performed, but also on the operation size. For example, 32-bit atomic ADD and 64-bit atomic ADD are in an embodiment considered to be two different operations. Similarly, if the underlying implementation distinguishes endianness, then this is in an embodiment also taken into account, at least for selected types of atomic operation. (However, these distinctions are not needed for all types of atomic operation.)

The "data" part of the temporary cache line will contain, as for normal cache lines, one or more data items (data entries). The number of data items in the temporary cache line will depend on the configuration of the cache (e.g. how much data each cache line can store) and the nature of the atomic operation in question (e.g. whether it operates on 32 or 16 bit values, etc.). The temporary cache line should be divided into data items of a size appropriate to the atomic operation being performed. There may be only one data item in the temporary cache line, but typically there will be plural data items (with the particular data item in the cache line corresponding to the memory address for the atomic operation then being used to accumulate the results of the atomic operations pending the arrival of the cache line containing the data from the memory address).

The preparing of the data items in the temporary cache line should be such as to allow the temporary cache line to accumulate appropriately the atomic operations for a thread or threads pending the arrival of the cache line containing the data for the memory address in question.

In one embodiment, each data item in the temporary cache line is prepared by initialising (setting) it to an identity value for the arithmetic operation for the atomic operation in question. Thus, in an embodiment, the temporary cache line for the atomic operation is prepared by setting all of the data items in the temporary cache line to an identity value for the arithmetic operation for the atomic operation in question. (As discussed above, the arithmetic operation's "identity value" is a value that when the arithmetic operation is performed with another value, leaves that other value unchanged.)

In another embodiment, each data item in the temporary cache line is prepared by marking it as being invalid (i.e., in effect, by marking it is being "uninitialised"). Each data item could, e.g., have an associated invalid or uninitialised bit or flag for this purpose. This can then allow atomic-arithmetic operations that do not have an identity value to be handled in the manner of the technology described herein.

In another embodiment therefore, an "uninitialized"-bit (an "invalid" bit) is stored per data item in the temporary cache line when preparing it, instead of an identity-value. (This can be done even where the arithmetic operation has an identity value, if desired.) (It will be appreciated that where a data item in the temporary cache line is marked as being "uninitialised", the data item will not contain a valid data value, but once "initialised" a data item will contain a valid data value.)

In this case, if all of the atomic operations have sizes that are multiples of an underlying storage unit (such as a byte), it would be possible to provide an uninitialized-bit per storage unit instead of per data item, so long as there exists at least one such bit for each data item in the temporary cache line. In this case, if the temporary cache line is stored in a cache that is already able to track e.g. per-byte dirty-bits, the dirty-bits can be used to provide the uninitialized-bit (the invalid-bit) functionality, if desired.

After the temporary cache line has been prepared, but before the cache line from memory arrives, the atomic operations for the set of threads is performed against the temporary cache line in the data cache (i.e. the atomic operations for the threads are performed against the data item in the temporary cache line that corresponds to the memory address that the atomic operation is to be performed against).

The technology described herein could be used where there is just a single atomic memory request to be performed against the memory address in question (i.e. the set of execution threads comprises only a single thread). However, the applicants have recognised that there can be situations where a given set of execution threads, for example, are each to execute the same atomic operation against the same memory address one after another. In this case, the temporary cache line can be, and is in an embodiment, used to accumulate the results of the plural atomic operations whilst waiting for the cache line from memory to arrive in the data cache.

Thus, in an embodiment, there is a set of plural execution threads that are to perform the same atomic operation against the same memory address and once the temporary cache line for the atomic operation has been prepared, the atomic operation is performed against the temporary cache line in the data cache for each thread in the set of threads in turn (such that the temporary cache line will then store a combined result of the atomic operation for the set of threads), until the cache line containing the data at the memory address that the atomic operation is to be performed against arrives in the data cache. The temporary cache line can then be combined with the arriving cache line to provide a result cache line containing the result of the atomic memory operation on the memory address that the atomic operation is to be performed against for the set of threads whose atomic operations were performed against the temporary cache line.

In this case, it may be that the atomic operation for all the threads in the set of threads is able to be performed against the temporary cache line before the cache line containing the data for the memory address arrives, or it may be that only some but not all of the threads in the set of threads can be processed against the temporary cache line before the cache line containing the data for the memory address arrives.

To facilitate this operation, each data cache in an embodiment has an associated queue that stores execution threads having associated atomic operations (maintains a queue of incoming atomic memory requests). Then, when a temporary cache line is allocated for a given atomic operation and memory address, the appropriate requests can be taken from the queue and performed against the temporary cache line in turn. Each entry in the queue in an embodiment has the memory address, data item and any other metadata needed for the memory request associated with it.

Thus, in an embodiment, after the temporary cache line has been prepared, but before the data (cache line) from memory arrives, the data cache accumulates queued (corresponding) atomic memory operations that are to use the same memory address into the temporary cache line, by taking each atomic memory request from the queue and performing it against the temporary cache line as if it was a normal cache line in turn. This is repeated for each queued atomic memory request that uses the same memory location and performs the same arithmetic operation on that memory location (if any), until the cache line containing the "true" data for the memory location in question arrives in the data cache.

The performing of the first atomic operation against the temporary cache line should, and in an embodiment does, store the operand value for the arithmetic operation (the atomic operand) for the first atomic operation (for the first thread) in the appropriate data item in the temporary cache line. This atomic operand value will, as is know in the art, normally be, and in an embodiment is, a register value for the atomic operation for the first thread, but could equally be an implicit operand value where the atomic operation does not have an explicit register value.

Thus, in the case where the data items in the temporary cache line are prepared by storing the identity value for the atomic operation in the temporary cache line, this can be, and is in an embodiment, done by reading (fetching) the current content for the memory location in the temporary cache line in question (which will be the identity value), performing the arithmetic operation for the atomic operation using that identity value and the first thread's (the first atomic operation's) operand value for the atomic operation, and then writing the result back to (the appropriate data item in) the temporary cache line.

Thus, in one embodiment, the operand value for the atomic operation for the first thread is stored in the temporary cache line by performing for the first thread, the arithmetic operation for the atomic operation using an identity value for the arithmetic operation for the atomic operation stored in the temporary cache line and the first thread's operand value for the atomic operation.

Where the data items in the temporary cache line are prepared by flagging them with invalid (uninitialised) bits, the storing of the operand value for the first atomic operation in the appropriate data item in the temporary cache line can be, and is in an embodiment, done by storing (writing) the operand value for the atomic memory request in question in the data item in question in the temporary cache line with the data item then being flagged as being initialised (valid). Alternatively, the identity value for the arithmetic operation could be written into the uninitialised (invalid) data item in the temporary cache line and then the atomic operation performed using the identity value as discussed above (with the data item again then being flagged as being initialised (valid).

Other arrangements for storing the operand value for the first atomic operation (for the first thread) in the appropriate data item in the temporary cache line could be used if desired. For example, a "move" or "bypass" operation or instruction that transfers the operand value to the data item in the temporary cache line could be used, if desired. In general any operation that can store the operand value for the first atomic operation in the appropriate data item in the temporary cache line can be used.

For any subsequent atomic operation to be performed on the temporary cache line, in an embodiment the current content (data item) for the memory location in question in the temporary cache line is fetched, the arithmetic operation for the atomic operation is performed using the operand (e.g. register) value for the atomic operation for the thread in question and the value stored in the temporary cache line, and then the result of the atomic operation against the value in the temporary cache line written back to the appropriate data item (location) in the temporary cache line.

Thus, in an embodiment, where there is a set of threads having atomic operations to be performed against the temporary cache line, and the temporary cache line has been initialised with an identity value for the atomic operation, the first thread will perform the arithmetic operation for the atomic operation using the identity value for the arithmetic operation for the atomic operation (stored in the temporary cache line) and the first thread's operand value for the atomic operation, and write the result back into the temporary cache line. The second thread will then perform the arithmetic operation for the atomic operation using the second thread's operand value for the atomic operation and the value stored in the temporary cache line (which will now be the first thread's operand value for the atomic operation), and write the result back into the temporary cache line. The third thread (if present) will then perform the arithmetic operation for the atomic operation using the third thread's operand value for the atomic operation and the value stored in the temporary cache line (which will now be the combined result of the first and second threads' operand values for the atomic operation), and write the result back into the temporary cache line, and so on for the other threads in the set of threads, if any, to thereby store in the temporary cache line a combined result of the arithmetic operation for the set of threads.

Correspondingly, when the atomic operation is to be performed on an "uninitialized" data item in the temporary cache line, the operand value for the atomic memory request in question is in an embodiment stored in the data item in question in the temporary cache line, and that data item is then flagged as initialized (valid). Subsequent atomic operations on the data item in the temporary cache line (i.e. on "initialised" ("valid") data items) can then be performed in the normal manner, using the value stored in the temporary cache line.

Thus, in an embodiment, where there is a set of threads having atomic operations to be performed against the temporary cache line, and the temporary cache line has been prepared using uninitialised (invalid) bits, the first thread will effectively write its operand value for the atomic memory request to the data item in question in the temporary cache line, and flag that data item as initialized (valid). The second thread will then perform the arithmetic operation for the atomic operation using the second thread's operand value for the atomic operation and the value stored in the temporary cache line (which will now be the first thread's operand value for the atomic operation), and write the result back into the temporary cache line. The third thread (if present) will then perform the arithmetic operation for the atomic operation using the third thread's operand value for the atomic operation and the value stored in the temporary cache line (which will now be the combined result of the first and second threads' operand values for the atomic operation), and write the result back into the temporary cache line, and so on for the other threads in the set of threads, if any, to thereby store in the temporary cache line a combined result of the arithmetic operation for the set of threads.

Once the cache line containing the data at the memory address that the atomic operation is to be performed against arrives in the data cache, that cache line is combined with the temporary cache line by performing the arithmetic operation for the atomic operation using the respective pair of data items (relating to the memory address in question) in the cache lines as operands (e.g. by performing an atomic addition using the respective pair of data items (one from each cache line) where the atomic operation is an atomic addition), to provide a "result" cache line.

In an embodiment, the combining operation also ensures that any other data items in the "result" cache line contain the value that was fetched from memory (i.e. that was in the "true" cache line) for those data items.

Thus, for example, where the temporary cache line was prepared by setting each data item to the identity value for the arithmetic operation, when the cache line containing the data at the memory address that the atomic operation is to be performed against arrives in the data cache, that cache line is in an embodiment combined with the temporary cache line by performing the arithmetic operation for the atomic operation for each respective pair of data items in the cache lines (e.g. by performing an atomic addition for the respective pair of data items (one from each cache line) where the atomic operation is an atomic addition), to provide a "result" cache line.

Correspondingly, where "uninitialised" bits have been used to prepare the temporary cache line, then this process in an embodiment comprises copying the data items in the incoming cache line for any "uninitialized" data items in the temporary cache across to the "result" cache line unchanged (i.e. any uninitialized data items in the temporary cache line cause the combining operation to just use the corresponding data from the incoming cache line unmodified).

The combined, result cache line should be written into the data cache. A new cache line could be allocated for this purpose, but in an embodiment, at least for no return atomics, the existing temporary cache line is used to store the result cache line. The result cache line can be, and is in an embodiment, immediately released for use (e.g. by another data cache) in the normal manner once it has been generated (i.e. it is not, and/or is no longer, marked as a "temporary" cache line).

The above operation of combining the cache lines using the atomic operation will provide the appropriate result value in the memory location for the set of atomic operations. Thus for a "no return" atomic, the process can be stopped at this point.

However, where the atomic is of the "return" variant, it is also necessary for each individual thread to return the datum that was present at the memory location before the atomic operation for that individual thread was performed. To achieve this, as well as combining the cache lines in the above manner to provide the final result for the memory address, it is also necessary to ensure that each individual thread returns its appropriate value.

To facilitate this operation, in an embodiment, for return atomic operation at least, when the atomic operation (for a thread) is performed against the temporary cache line, the atomic memory operation for the thread is not then returned to the initiator but instead is stalled until the combining operation of the temporary cache line and the fetched cache line for the memory address has been completed. To do this, the atomic memory operation is in an embodiment placed in a buffer for stalled memory requests. Each atomic memory operation that is stored in the buffer in an embodiment had associated with it the identity of the thread it came from (so the result of the atomic operation can be returned to the correct place), the atomic operation in question, and any arguments to (needed for) the atomic operation. Correspondingly, each entry in the buffer for stalled memory requests in an embodiment has the memory address, data item and any other metadata needed for the memory request associated with it.

In one embodiment, when an atomic memory request is put in the "stalled request" buffer, it keeps its original argument value. In another embodiment, it replaces its argument value with the data value read from the temporary cache line. In an embodiment, which of these approaches to use can be selected based on the type of atomic operation in question.

The atomic memory request is in an embodiment then flagged as "stalled".

Then, once the temporary cache line and the incoming "true" cache line have been combined to provide the result cache line, any stalled memory requests that relate to the memory address in question are in an embodiment then performed using the data in the memory address from the incoming cache line. To do this, the appropriate stalled memory requests are in an embodiment read out from the buffer in turn and performed.

To facilitate this operation, the data in the incoming cache line is in an embodiment retained in the data cache while the stalled atomic operations are performed. This can be achieved as desired, for example by copying the incoming cache line's data to another cache line (which is then in an embodiment marked as being a temporary cache line). In an embodiment, the incoming cache line is marked as being a temporary cache line once the combining operation has been completed (so that the original data from the memory address before the set of atomic operations will then be retained in the data cache). This is possible because it is the new, combined result cache line that will now contain the "true" data for the memory address in question that other atomic operations, etc., may then require.

The stalled memory requests should be completed in the appropriate manner for the atomic operation in question.

Thus, for each stalled atomic memory request, the stalled request's stored data item (argument value) and the contents of the temporary cache line are in an embodiment read, and then the atomic-arithmetic operation in an embodiment used to combine them appropriately, and the appropriate value is returned to the initiator.

In this regard, the exact action to perform to complete the atomic operation will depend on whether the stalled atomic operation's atomic-argument value was "kept" or "replaced" (as discussed above) when the atomic operation was placed in the stalled requests buffer.

If the atomic-argument values were "replaced", then in an embodiment, for each stalled atomic memory request, the temporary cache line containing the previous contents of the cache line from memory is read, the read value is combined with atomic-request's operand value (data item) (in the stalled requests buffer) using the arithmetic operation for the atomic operation, and then the combined value is returned to the initiator. The temporary cache line containing the previous contents of the cache line from memory is itself left unmodified.

If the atomic-argument values were "kept", then in an embodiment, for each stalled atomic request, the temporary cache line containing the previous contents of the cache line from memory is read, an atomic read-modify-write operation is performed on the temporary cache line, and the old value read from the temporary cache line is returned to the initiator. In other words, in this case, the stalled atomic memory operation in an embodiment reads the value from the cache line and returns the read value to its initiator, and performs its atomic operation using the read value and writes the result of the atomic operation back to the cache line.

In an embodiment, the (and each) data cache tracks for a given temporary cache line, which stalled memory entries are parked awaiting the data from memory (the "true" cache line). Then, after the temporary and "true" cache lines have been combined, the relevant stalled atomic memory requests to be performed are in an embodiment identified using the tracking information.

If uninitialized-bits are used in an arrangement where stalled atomic memory requests have their argument values replaced with the data value read from the temporary cache line, then the value that is read from the temporary cache line and stored with the memory request when it is placed in the stalled memory requests buffer should and in an embodiment does carry with it the uninitialized-bits.

It may also be necessary to perform the above stalled atomic memory request "replaying" operation in data processing systems that require strict memory order to be enforced, even in the case of no return atomics.

Where plural atomic operations are to be performed against closely located memory addresses that will all appear in the same cache line, then a single temporary cache line can be, and in an embodiment is, used to accumulate results for the plural atomic memory operations. Thus, in an embodiment, a single temporary cache line is used to accumulate results for plural atomic memory operations that each use different memory addresses. Thus, in an embodiment there are multiple data items in a given temporary cache line that the atomic operations are to be performed against.

It would also be possible to simultaneously allocate plural temporary cache lines each associated with memory addresses that will all appear in the same cache line, and then combine the "true" cache line with each respective temporary cache line separately when the "true" cache line arrives in the data cache.

As will be appreciated from the above, after the cache line combining (merge) operation has been performed, snoops from other data caches may cause the "true" cache line to disappear from the data cache before the spooling of the stalled memory requests has completed. In this case, if a new atomic-request appears for the same memory address, a new temporary cache line for the memory address is in an embodiment allocated, even if the old temporary cache line still exists for the same memory address. In this case, any temporary cache line hits should, and in an embodiment do, hit the new temporary cache line, not the old one. To facilitate this, the cache line combining process in an embodiment also modifies the state of the temporary cache line in question so as to prevent getting hits on old temporary cache lines.

In an embodiment, if memory accesses are attempted that match a temporary cache line's address but do not match the temporary cache line's atomic-operation, then either the attempted access is stalled until the cache line merging process has been completed for the existing temporary cache line, or an additional temporary cache line is allocated for each separate atomic-operation on the memory address. In the latter case, when the external data (cache line) arrives from memory, multiple cache line "merge" operations are in an embodiment then performed, one for each temporary cache line bound to the memory address. In an embodiment which of these approaches to use can be selected for different atomic operations.

The above discusses the situation where the data required for the atomic operation is not present in the data cache. If the data from main memory needed for the atomic operation is already present in the relevant data cache, then the atomic operation can simply be performed on the cache line storing that data in the data cache in the normal manner.

The instructions for performing the atomic operations will be included in the instruction stream for an execution stage (of the execution pipeline) by a compiler for the execution stage. Thus, in the case of a graphics processing system, the shader compiler for the graphics processing pipeline in an embodiment performs this operation. The compiler may, e.g., and in an embodiment does, run on a host processor of the data processing system that includes the execution pipeline (with the execution pipeline then being on another processor, such as a graphics processor that is associated with the host processor (such that the compiler and compiled code all run on separate processors within the overall data processing system, e.g. graphics processing system)). However, other arrangements would be possible, such as a compiler running on the same processor as the compiled code, or the compiler being run on a separate processor, such as the program being pre-compiled on a separate system and being distributed in a compiled form.

In the case of a graphics processing pipeline, the execution units (stages) in an embodiment comprise programmable, shading stages of the graphics processing pipeline such as the vertex shader, fragment shader, etc. These stages can be implemented as desired and in any suitable manner, and can perform any desired and suitable shading, e.g. vertex shading, fragment shading, etc., functions, respectively and as appropriate. In the case of a fragment shader, for example, the fragment shader may render a primitive or primitives to generate a set of render output values, e.g. representing a frame for display. These output values may then be exported to external memory for storage and use, such as to a frame buffer for a display.

In an embodiment all the execution stages (each execution stage) of the execution pipeline can and do operate in the manner of the technology described herein.

Each programmable processing stage (execution unit) may comprise any suitable programmable hardware element such as programmable processing circuitry. Each programmable processing stage may be provided as a separate circuit element to other programmable stages of the processing pipeline or the programmable processing stages may share some or all of their programmable processing circuitry (that is then differently programmed to serve as the desired programmable processing stage).

As well as the programmable processing (shader) stages, a graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

Figure 3:
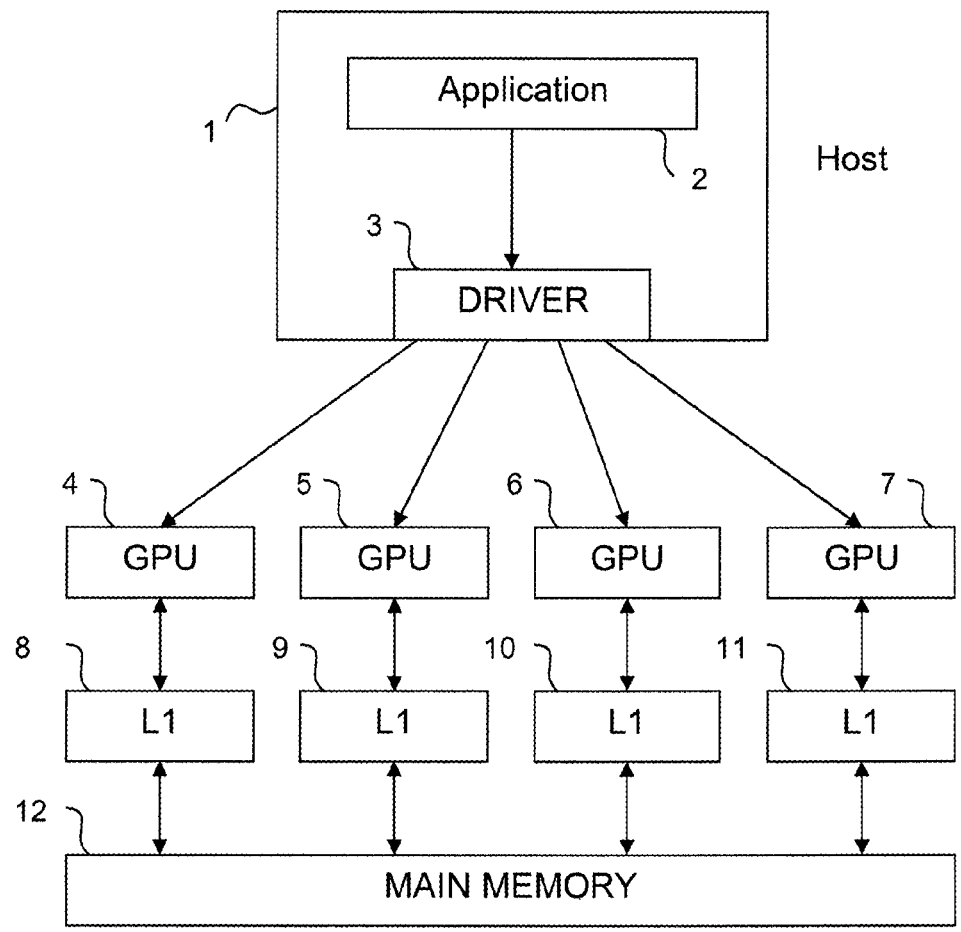
FIG. 3 shows an exemplary computer graphics processing system having multiple data caches.

FIG. 3 shows an exemplary computer graphics processing system that includes a host processor 1, and four associated graphics processing units (GPUs) that perform processing operations under the control of the host processor 1. Each GPU is in the form of a graphics processing pipeline and has an associated Level 1 (L1) cache 8, 9, 10, 11 that is used to store data from main memory 12 for operations for the GPU in question.

An application 2, such as a game, executing on the host processor 1 will require graphics processing operations to be performed by the associated graphics processing units (graphics processing pipelines) 4, 5, 6, 7. To do this, the application will generate API (Application Programming Interface) calls that are interpreted by a driver 3 for the graphics processing units that is running on the host processor 1 to generate appropriate commands to the graphics processing units to generate graphics output required by the application 2. To facilitate this, a set of "commands" will be provided to the graphics processing units in response to commands from the application 2 running on the host system 1 for graphics output (e.g. to generate a frame to be displayed).

Figure 4:
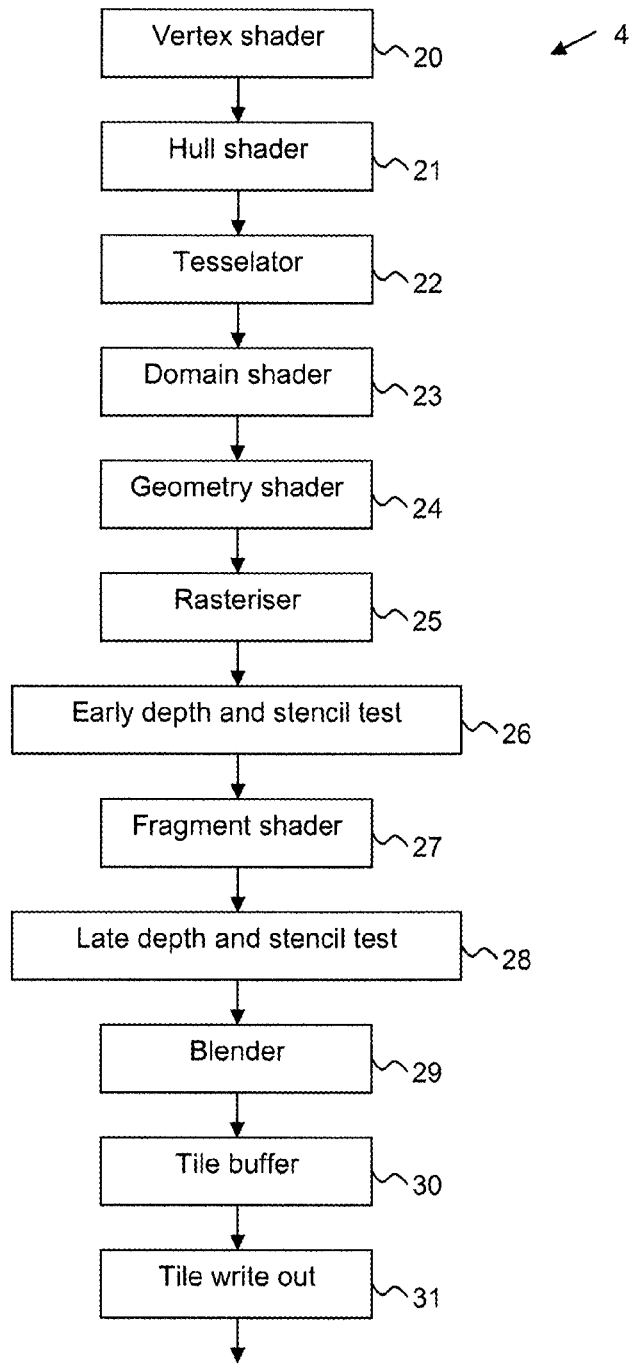
FIG. 4 shows schematically a graphics processing unit of the computer graphics processing system of FIG. 3 and that can be operated in the manner of the technology described herein.

FIG. 4 shows one of the graphics processing units of the present embodiment in more detail. Each of the graphics processing units shown in FIG. 3 has the configuration shown in FIG. 4.

The GPU (graphics processing pipeline) shown in FIG. 4 is a tile-based renderer and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

(As is known in the art, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 4 shows the main elements and pipeline stages of the graphics processing pipeline that are relevant to the operation of the present embodiment. As will be appreciated by those skilled in the art there may be other elements of the graphics processing pipeline that are not illustrated in FIG. 4. It should also be noted here that FIG. 4 is only schematic, and that, for example, in practice the shown functional units and pipeline stages may share significant hardware circuits, even though they are shown schematically as separate stages in FIG. 4. It will also be appreciated that each of the stages, elements and units, etc., of the graphics processing pipeline as shown in FIG. 4 may be implemented as desired and will accordingly comprise, e.g., appropriate circuitry and/or processing logic, etc., for performing the necessary operation and functions.

As shown in FIG. 4, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20, as is known in the art, takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

As is known in the art, the hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates, as is known in the art, to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs, is known in the art, a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer will store, as is known in the art, colour and depth buffers that store an appropriate colour, etc., or Z-value, respectively, for each sampling point that the buffers represent (in essence for each sampling point of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 3. Further features of the operation of the graphics processing system shown in FIG. 3 in accordance with embodiments of the technology described herein will now be described.

As can be seen from FIG. 4, each GPU (graphics processing pipeline) includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application. To do this, the application 2 provides the shader programs implemented using a high-level shader programming language, such as GLSL, HLSL, OpenCL, etc. These shader programs are then translated by a shader language compiler to binary code for the target graphics processing units. This may include, as is known in the art, the creation of one or more intermediate representations of the program within the compiler. (The compiler may, e.g., be part of the driver 3, with there being a special API call to cause the compiler to run. The compiler execution can thus be seen as being part of the draw call preparation done by the driver in response to API calls generated by an application).

As discussed above, each shader in the graphics processing pipeline is a processing unit that performs graphics processing by running small programs for each graphics item in a graphics output to be generated (an "item" in this regard is usually a vertex, a fragment or a pixel). The present embodiments relate to the situation where execution threads to be executed by shaders of the graphics processing units (where each thread corresponds to one graphics item) are to perform atomic memory operations.

As discussed above, an "atomic" memory operation is an operation sequence that reads a memory location, performs an arithmetic operation between the memory value and an operand (e.g. register) value, and then writes the result of the arithmetic operation back to the same memory location. This sequence of operations is carried out so that to every observer, it looks as if the sequence has either not been performed at all, or been performed in its entirety. It is executed as one indivisible unit, hence the name "atomic". The arithmetic operation that is performed as part of the atomic is usually a simple operation, that is usually both commutative and associative, such as: Integer Add; Bitwise AND, OR, XOR; Minimum Value; Maximum Value.

Atomic memory operations typically occur in two variants: "Return" and "NoReturn". The "Return" variants return back to the shader the datum that was present at the memory location before the "atomic" operation was performed. The "NoReturn" variants do not return any value back to the shader.

In the present embodiments, atomic operations for a given graphics processing unit are performed using data (cache lines) stored in (are performed against) the corresponding L1 cache for the graphics processing unit in question. Thus, in order to be able to perform an atomic memory operation, the relevant data (cache line) must be present in the L1 cache in question.

Each L1 cache maintains a queue of incoming atomic memory requests and a buffer for stalled atomic memory requests. Each entry in the queue and the stalled requests buffer has space for one address, one data item, and any other metadata needed for one atomic memory request.

When an atomic memory operation in the queue is to be performed by a shader of a graphics processing unit, it is first checked if the relevant data (cache line) is stored in the L1 cache in question. If it is, the atomic memory operation proceeds in the normal manner.

However, if the data (the cache line) is not present in the L1 cache, a temporary cache line is allocated to the atomic memory operation. This temporary cache line is tagged with the memory address for the atomic operation and the (type of) atomic operation itself, and will contain as many data items (data values) as would a "true" cache line in the system for the atomic operation in question.

The temporary cache line is a "cache line" that takes up resources (space) in the data cache, but can only be used for the accumulation of the appropriate atomic memory operations (i.e. that match the tag of the temporary cache line (the same atomic operation, the same memory address or at least a memory address within the same cache line), and cannot otherwise be read, written to, snooped, or in any other way interacted with.

The temporary cache line for the atomic operation is then prepared by setting all of the data items in the temporary cache line to an identity value for the arithmetic operation for the atomic operation in question.

The arithmetic operation's "identity value" that is used to initially fill the temporary cache line is a value that when the arithmetic operation is performed with another value, leaves that other value unchanged. Thus, if a given arithmetic operation is denoted with the operator %, the arithmetic operation's identity value is a value V such that for all possible input values X, V % X=X % V=X. For example, for following arithmetic operations, the corresponding identity values V are:

Integer Add: V=0
Bitwise OR, Bitwise XOR: V=0
Bitwise AND: V=an all-1s bitvector
Minimum Value: V=the largest representable number in the memory value's format
Maximum Value: V=the smallest representable number in the memory value's format.

A memory request is also sent out to the memory subsystem to fetch the contents of the memory address in question (i.e. the data that is needed for the atomic operation) into the L1 cache.

After the temporary cache line has been prepared, but before the data (cache line) from memory arrives, the L1 cache accumulates the queued atomic memory operations that are to use the same memory address into the temporary cache line. To do this, an atomic memory request is taken from the queue and performed against the temporary cache line as if it was a normal cache line. Thus the current content (data item) for the memory location in question in the temporary cache line is fetched, and then the result of the atomic operation against the value in the temporary cache line is written back to the appropriate data item (location) in the temporary cache line.

The atomic memory request is not then returned to the initiator that made the request (in this case a shader of the GPU), but instead is submitted to the stalled memory requests-buffer. When the memory request is put in the Stalled memory requests-Buffer, it can either keep its original argument value, or replace its argument value with the data value read from the temporary cache line. (An implementation may choose either of these approaches for different atomic operations. For example, as a "keep" approach or a "replace" approach are likely to have unequal power consumption, it may be that one or other approach will be better for different atomic operations.)

The atomic memory request is then flagged as stalled.

This is then repeated for each queued atomic memory request that uses the same memory location and performs the same arithmetic operation on that memory location (if any), until the cache line containing the "true" data for the memory location in question arrives in the L1 cache.

When the "true" data from memory arrives in the L1 cache (the cache line with the memory address content arrives), the L1 cache stops its normal operation, and uses the arithmetic operation of the atomic operation to combine the content of the temporary cache line and the incoming cache line (to "merge" the temporary cache line and the incoming cache line).

For example, if the atomic operation is 32-bit ADD, then a 32-bit ADD is performed between every respective 32-bit data item of the temporary cache line and of the incoming cache line.

The combined (merged) cache lines' result is then put into a normal cache line, and the incoming cache line (with the data from memory) is copied unmodified into the temporary cache line.

The L1 cache then resumes its normal operation. Thus, the resultant merged cache line can be used to serve all sorts of memory accesses normally (loads, stores and atomics) and can respond to snoops. (If the cache line is snooped during the merging process, then the snoop response is withheld until the merging is completed.)

After the merging process has completed, the stalled atomic memory requests that were placed in the stalled memory requests buffer for the memory address in question are completed. To do this, the atomic memory requests are spooled out of the stalled memory requests buffer one at a time.

For each parked atomic memory request, the request's data item and the contents of the temporary line (which will now continue the previous contents of the cache line from memory) are read, and then the atomic-arithmetic operation is used to combine them.

In this regard, the exact action to perform to complete the atomic operation will depend on whether the atomic operation's atomic-argument value was "kept" or "replaced" when (as discussed above) the atomic operation was "parked" in the stalled memory requests buffer.

If the atomic-argument values were "replaced", then for each stalled atomic request, the temporary cache line is read and the result is combined with atomic-request's data item using the arithmetic operation for the atomic operation, and then the combined value is returned to the shader (the initiator). The temporary cache line itself is left unmodified.

If the atomic-argument values were "kept", then for each stalled atomic request, the temporary cache line is read, an atomic read-modify-write operation is performed on the temporary cache line, and the old value read from the temporary cache line is returned to the shader.

In the present embodiment, each L1 cache tracks for a given temporary cache line, which Stalled memory requests-buffer entries are parked awaiting the data from memory (the "true" cache line). This can be done as desired. This way, after the temporary and "true" cache lines have been "merged", the relevant parked atomic memory requests can be spooled out one after another, using the tracking information. This helps to make the process more efficient.

The implementation described above provides support for the "Return" variant of atomics operation.

For "NoReturn" atomics (which can be common in graphics processing) that do not require strict memory ordering, the "parking" of the atomic memory requests in the stalled memory requests buffer and the completion of those requests after the merging (combining) of the temporary cache line and the incoming cache line with the values from memory can be omitted. (In other words, all that is required for no return atomics that do not require strict memory ordering is to accumulate the atomic operations into the temporary cache line and to then combine (merge) those values with the "true" cache line when it arrives from memory (and to then provide the combined (merged) values for use).

For no return atomics that do require strict memory ordering, then in order to meet the ordering guarantee, the atomic operations are in an embodiment retained in the stalled requests buffer until the merging (combining) of the temporary and fetched cache line have been completed (at which point the atomic operations can be reported as being completed), but there is no need to do any further processing of the stalled memory requests as would be required for return atomics.

In the present embodiments, the "atomic-operation" that is used to tag the temporary cache line for selected (and most) atomic operations distinguishes not just on the operation to be performed, but on the operation size as well. For example 32-bit atomic ADD and 64-bit atomic ADD are considered to be two different operations. Similarly, if the underlying implementation distinguishes endianness, then this is also taken into account: e.g. a 32-bit little-endian atomic ADD is be treated as a different operation from 32-bit big-endian atomic ADD. (However, these distinctions are not needed for all atomic-operations. For example, atomic AND/OR/XOR do not need operand size or endianness distinction.)

If an "Integer Add Modulo a constant K" atomic-operation is provided, then each different value of "K" is considered to be a different operation for the purpose of the temporary cache line's tag. Similarly, if a "Compare-And-Swap" atomic-operation is provided, each different comparison value is considered to be a different operation for the purpose of the temporary cache line's tag.

FIGS. 5A, 5B and 5C, and 6A, 6B and 6C, show schematically the above operation for a given graphics processing unit for two embodiments of the technology described herein.

Figure 5A:
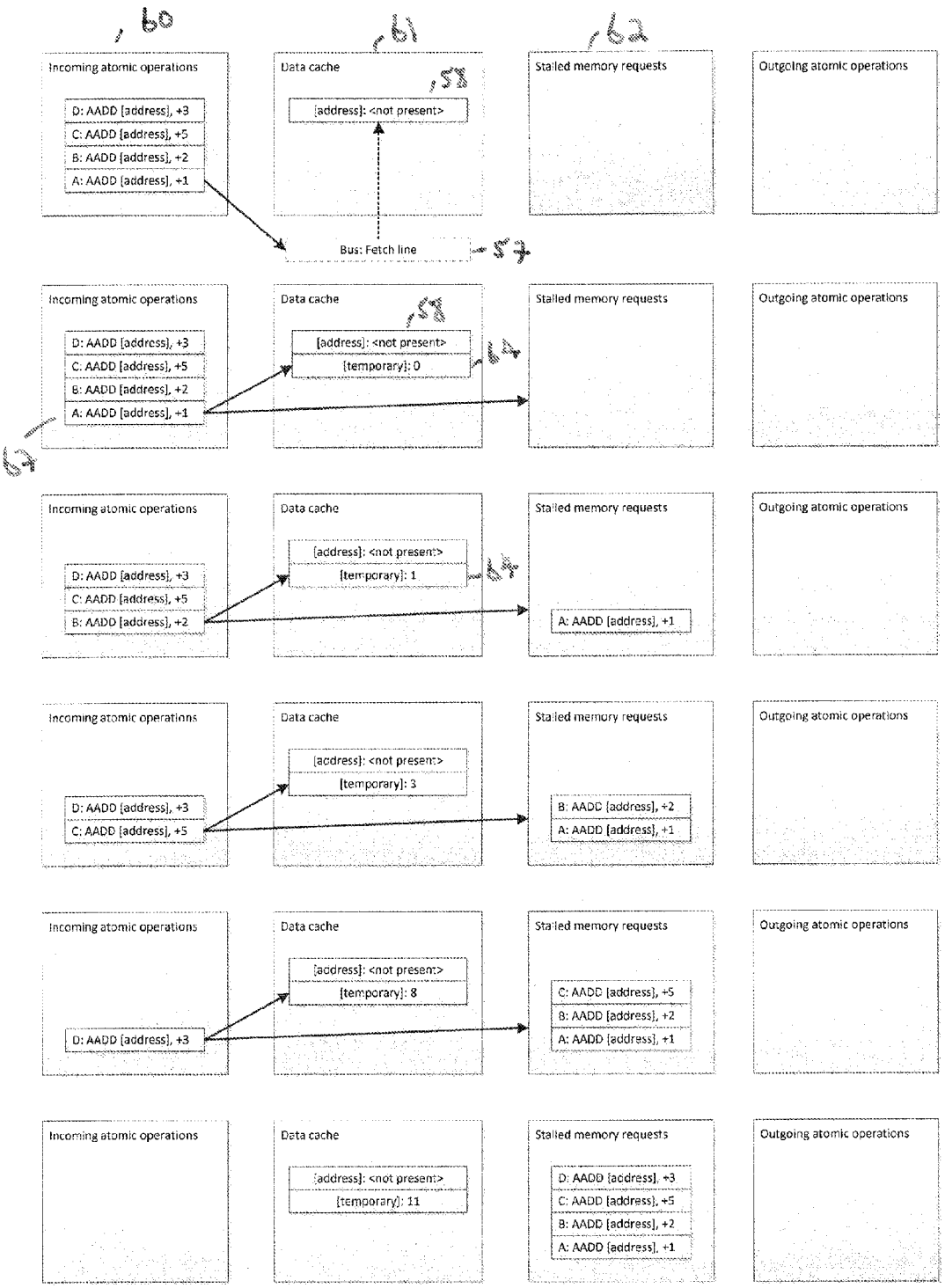
Figure 5B:
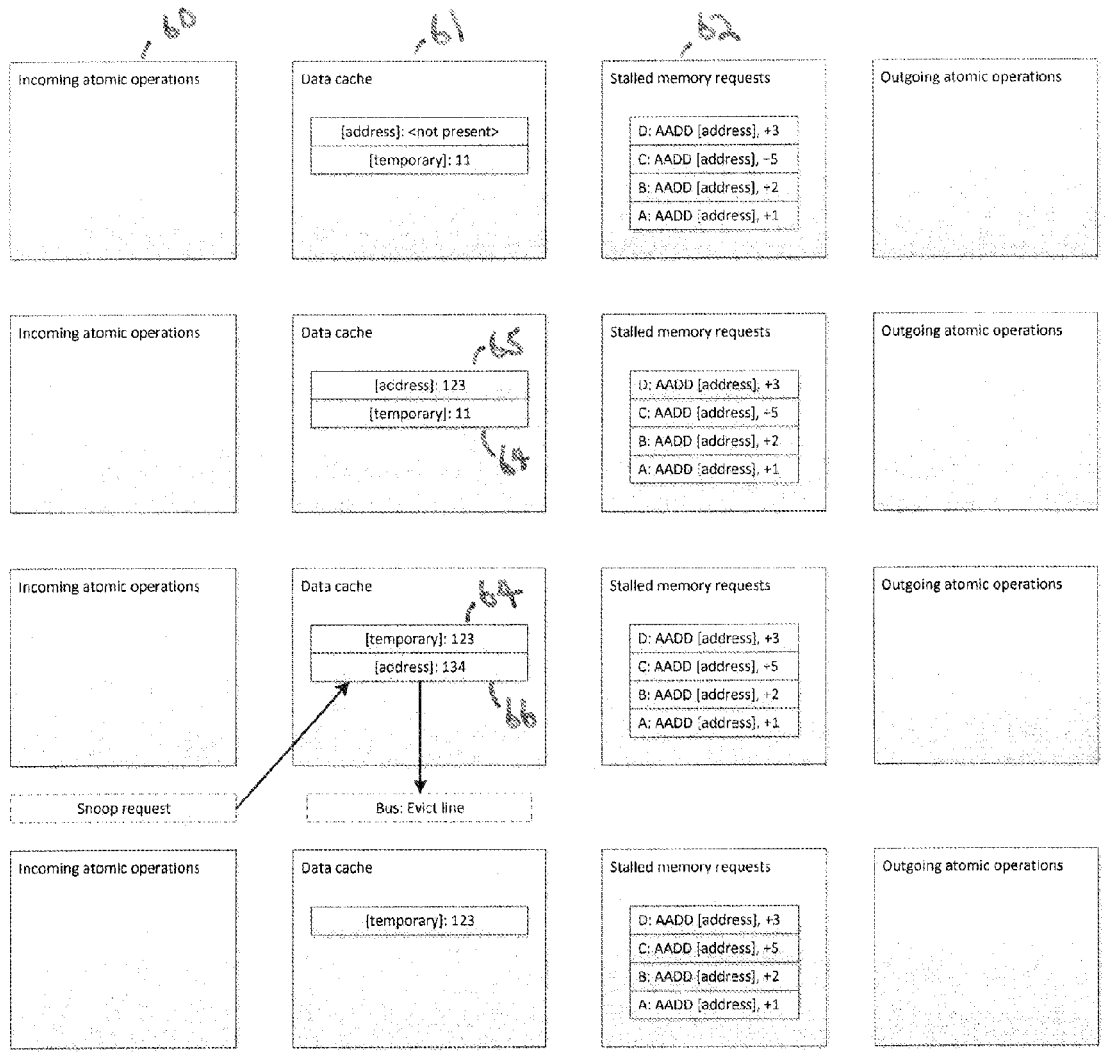

FIGS. 5A, 5B and 5C show schematically the operation in a first embodiment in which each stalled atomic operation keeps its original argument value.

As shown in FIG. 5A, the L1 data cache 61 of the graphics processing unit in question has a queue 60 for storing incoming atomic memory operations to be performed, and a buffer 62 for storing stalled atomic memory requests.

As shown in FIG. 5A, it is assumed that initially the atomic memory request queue 60 contains four pending atomic memory requests for respective threads A, B, C, D that are to perform an atomic operation (which in this case is an atomic ADD operation) to the same memory address (location). It is also assumed that the data cache 61 does not currently store the data from memory (the cache line) that is required for the atomic memory operation.

In view of this, as shown in FIG. 5A, a temporary cache line 64 is allocated in the data cache 61 and tagged with the memory address needed for the queued atomic operations, and the type of atomic operation in question.

The data item in the temporary cache line is then initialised to the identity value for the atomic operation in question (thus "0" in this case as the atomic operation is an atomic ADD). At the same time, a memory request 57 is sent out to the memory subsystem to fetch the cache line containing the data in memory at the memory address in question and space 58 for that cache line is allocated in the buffer 61. (It is assumed here (and in the embodiment shown in FIGS. 6A, 6B, 6C) that each cache line in the data cache 61 will only contain one data item (as shown in FIG. 5A). However, each cache line could contain more than one data item. In that case, each data item in the temporary cache line would be initialised to the identity value for the atomic operation in question.)

As shown in FIG. 5A, while the graphics processing unit waits for the data from the memory address in main memory (the cache line) to arrive, the queued atomic memory operations are performed against the temporary line 64 in the data cache 61 as if it were a normal cache line so as to accumulate the results of the atomic memory operations into the temporary line 64.

Thus as shown in FIG. 5A, the atomic ADD operation for the first thread A 67 is performed against the contents of the temporary line 64 in the data cache 61.

To perform the atomic operation, the content (data value) of the data item corresponding to the specific memory location in question in the temporary cache line 64 in the data cache 61 is fetched, the arithmetic operation for the atomic operation is performed using that data value, and the result of the atomic operation is then written back to the data item (memory location) in the temporary cache line (i.e. the temporary cache line is itself modified).

The thread A thus performs its atomic ADD operation using the stored identity value ("0") in the temporary cache line 64 and stores the result of that operation ("1") in the temporary cache line. Thus after the atomic operation for the thread A the relevant data item in the temporary line will now have the value "1" as shown in FIG. 5A.

Once the thread A has performed its atomic operation, the memory request for the thread A is not then returned to the initiator (shader), but instead, as shown in FIG. 5A, it is placed in the stalled memory requests buffer 62. In the embodiment shown in FIGS. 5A, 5B and 5C, it is assumed that the stalled memory requests will keep, as shown in FIG. 5A, their original argument values (thus "+1" for the thread A). The memory request is also flagged as being stalled.

Once the thread A has executed its atomic operation against the temporary cache line, then the next thread in the queue, thread B, can execute its atomic operation 68 against the temporary cache line 64. As shown in FIG. 5A, to do this, the thread B reads the value in the cache in the memory location in the temporary cache line (now "1"), performs its atomic ADD operation (+2) against the data value in that memory location in the temporary line, and writes the result of its atomic operation ("3") back to the memory location in the temporary cache line. Thus, as shown in FIG. 5A, the memory location in the temporary cache line 64 will now contain the value "3".

Again, the atomic operation for the thread B is placed in the stalled memory requests buffer 62, in this case retaining its original argument value "+2".

As shown in FIG. 5A, this process is continued for the remaining atomic operations in the queue 60 that access the same memory address, such that once all the appropriate atomic operations in the queue 60 have been performed against the temporary cache line, the temporary cache line 64 in the data cache 61 will store, in this case, an accumulated (combined) increment value of 11 for the queued atomic memory requests that share the same memory address. Correspondingly, the stalled memory requests buffer 62 will contain the atomic memory requests that were in the queue 60, but that have now been performed against the temporary cache line 64 in the data cache 61.

The operation then waits until the cache line with the desired memory contents (i.e. for the memory address in question) arrives in the data cache 61.

FIG. 5B shows the operation when the cache line 65 with the main memory contents arrives in the data cache 61. As shown in FIG. 5B, at this point the data cache 61 will store both the temporary cache line 64 and the "true" cache line 65 from the memory.

Then, as shown in FIG. 5B, the arithmetic operation of the atomic operation in question is used to combine (merge) the contents of the temporary cache line 64 with the incoming "main memory" cache line 65. Thus, in this case, as the atomic operation is an ADD operation, an add is performed between every data element of the temporary cache line 64 and of the incoming "true" cache line 65. This result of this operation (in this case "134") is then stored in a normal cache line 66 in the data cache 61, while the incoming cache line 65 (the incoming data) from main memory is copied unmodified into the temporary cache line 64.

The result of this then is, as shown in FIG. 5B, that the data cache 61 will contain a "normal" cache line 66 that contains the accumulated results of the atomic operation (in this case "134"), and a temporary cache line 64 containing the original values from the main memory (in this case "123").

The "normal" cache line 66 containing the result of the accumulated atomic operations can then be released for use by other graphics processing units, atomic operations, etc., or returned to main memory, as appropriate.

Following this, as shown in FIG. 5B, the data cache 61 will contain a temporary cache line 64 containing the data from the original cache line in memory (i.e. before the atomic operations were performed).

This process completes the combined atomic operation for the set of queued atomic operations. However, at least in the case of return atomic operations, it is also necessary to perform the individual atomic operations appropriately. This process is performed for the present embodiment as shown in FIG. 5C.

As shown in FIG. 5C, once the data cache 61 is storing in the temporary cache line 64 the original memory values (i.e. the values in memory prior to the queued atomic operations), then the parked atomic operations in the stalled memory requests buffer 62 can be and are completed using the data in the temporary cache line. This is done by spooling the parked atomic operations out of the stalled memory requests buffer one at a time, and for each operation, reading the atomic operation's data item and the content of the temporary cache line, and then using the arithmetic operation for the atomic operation to combine them to provide the atomic operation return value (that is then returned to the shader (initiator)).

In this embodiment, because each parked atomic operation kept its original argument value, this operation comprises, for each stalled atomic request, reading the temporary cache line, performing an atomic read-modify-write operation on the temporary cache line to update the value in the temporary cache line, and returning the old value read from the temporary cache line to the shader (in accordance with return atomic operation).

Thus, as shown in FIG. 5C, thread A will perform its atomic add operation ("+1") using the value in the temporary cache line ("123"), write the appropriately modified value (in this case "124") into the temporary cache line 64 and return 69 the original value of the temporary cache line (in this case "123"). The thread B will then perform its atomic add operation on the temporary cache line, thereby modifying the value in the temporary cache line to "126", and return the previous value in the temporary cache line (namely "124"), and so on for each parked atomic operation in the stalled memory requests buffer 62, as shown in FIG. 5C.

Once all the parked atomic operations have been completed, the temporary line in the data cache 61 can be released, as shown in FIG. 5C.

It will be appreciated that the arrangement shown in FIG. 5C is required for the "return" variant of atomic operation. In the case of "no return" atomics, the operation shown in FIG. 5C of performing each parked atomic operation against the temporary cache line and returning the data value can be omitted, as can the parking of the atomic requests in the stalled memory requests buffer 62 in the case of no return atomics that do not require strict memory ordering.

Figure 6A:
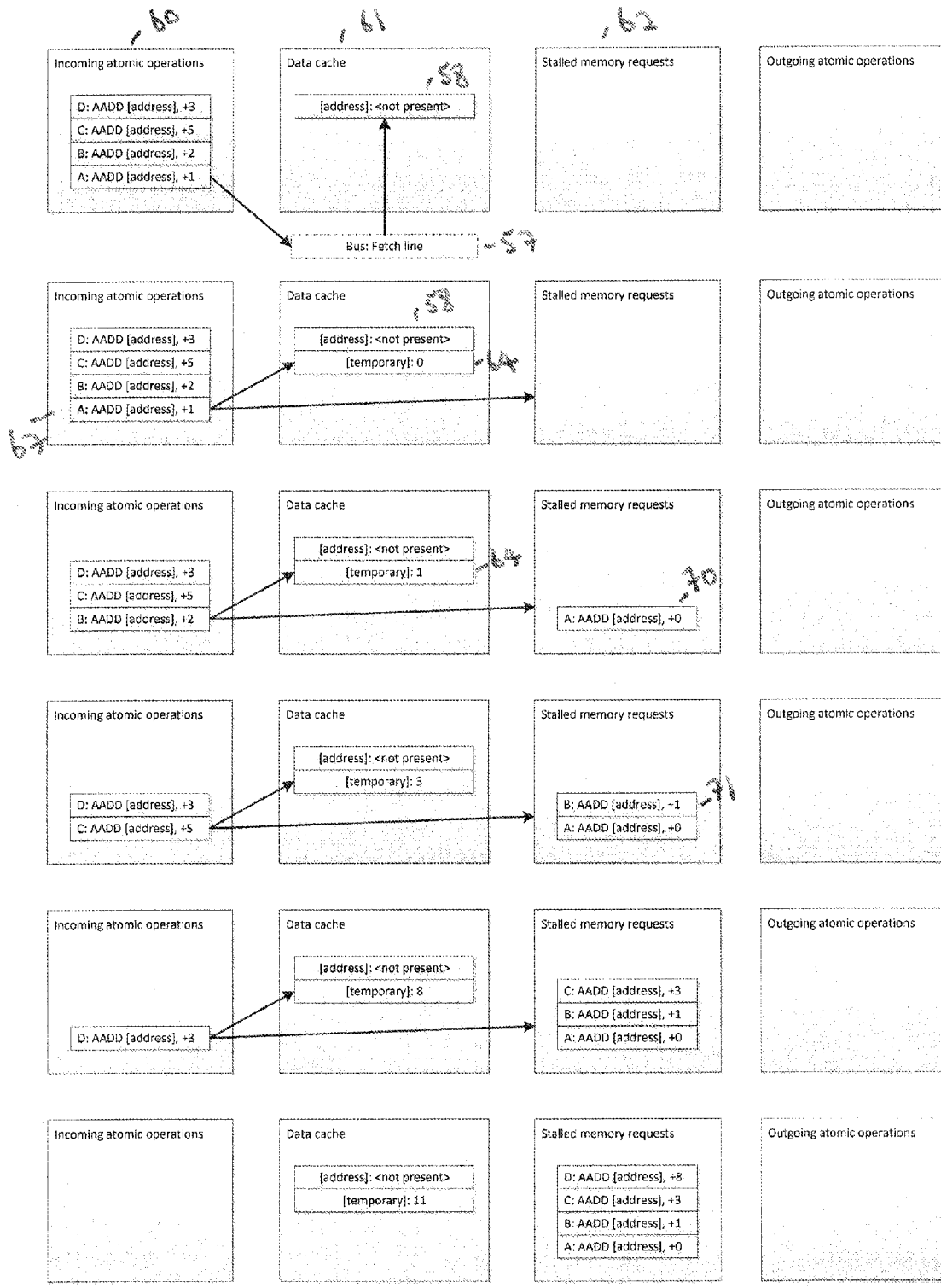
Figure 6B:
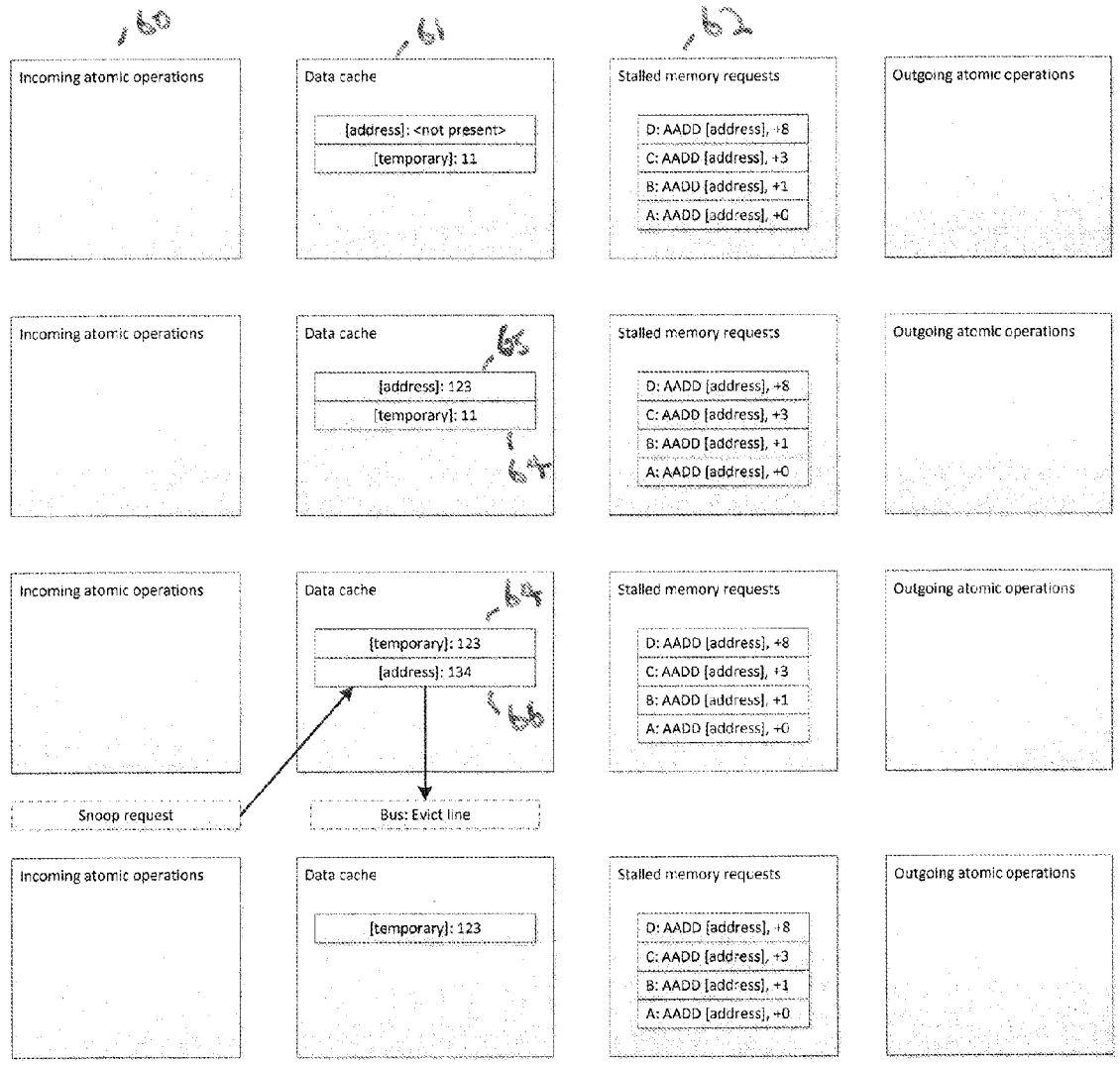
Figure 6C:
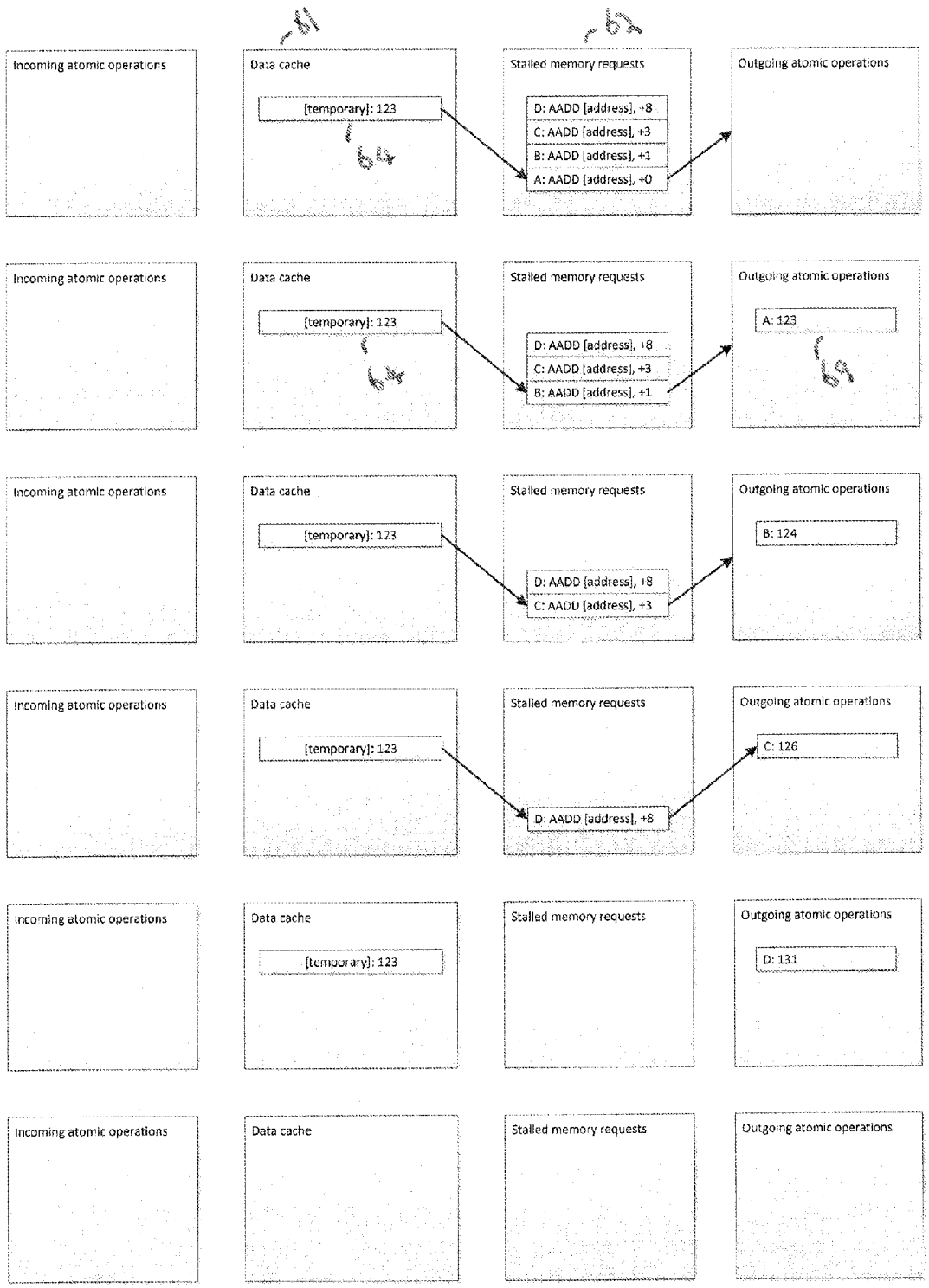

FIGS. 6A, 6B and 6C show an alternative embodiment of the operation shown in FIGS. 5A, 5B and 6C.

In general, the operation shown in FIGS. 6A, 6B and 6C corresponds to the operation shown in FIGS. 5A, 5B and 5C (and so will not be described again). However, as shown in FIG. 6A, rather than each atomic memory request that is parked in the stalled memory requests buffer 62 keeping its original argument value, the atomic request's argument value is replaced with the data value read from the temporary cache line.

Thus, as shown in FIG. 6A, for example, an argument value of "+0" rather than "+1" is stored for the thread A 70. Correspondingly, for the thread B, the argument value stored for that thread in the stalled memory requests buffer 62 is "+1" rather than "+2" 71, for the thread C it is "+3", rather "+5", and so on.

Then, as shown in FIG. 6C, when the parked atomic memory requests are completed after the merge operation has been performed, rather than reading the temporary cache line and performing an atomic read-modify-write operation on the temporary cache line for each parked atomic request, the temporary line value is instead read and combined with the atomic request is stored argument value in the stalled memory requests buffer 62, with that combined value then being returned as the return value for the atomic operation, but the temporary cache line itself is left unmodified.

Again, for no return atomics, the operation shown in FIG. 6C, and in the case of no return atomics that do not require strict memory ordering the parking of the atomic memory requests in the stalled memory requests buffer, can be omitted.

Various alternatives and additions to the above embodiments would be possible, if desired.

For example, the above embodiments illustrate the operation of the technology described herein where there is a single data value in each cache line that the atomic operations should be performed against. However, these arrangements can correspondingly be used where there are multiple data values (data items, memory addresses) in a given cache line that the atomic operations are to be performed against.

For example, although the above embodiments have been described with reference to an atomic addition operation, the above arrangements can correspondingly be used for other atomic operations. Thus, other atomic operations may be implemented as appropriate variants of the above processes.

Examples of atomic operations that the present embodiments can be applied to (and their corresponding identity values, V, if any) are:

Integer Add: V=0
Bitwise OR, Bitwise XOR: V=0
Bitwise AND: V=an all-1s bitvector
Minimum Value: V=the largest representable number in the memory value's format
Maximum Value: V=the smallest representable number in the memory value's format
Saturating unsigned integer add: V=0
Integer multiply: V=1
Floating-point add: V=−0.0
Floating-point multiply: V=1.0
Integer add, modulo a constant K: V=0 (A variant of this operation can occur in some GPUs, in the form of an atomic increment/decrement instruction where the "register" input is constant 1, and the value K is provided as an actual argument).

Also in the above embodiments the data items in the temporary cache line are initialised with the identity value for the arithmetic operation for the atomic operation. However, atomic-arithmetic operations that do not have an identity value cannot be handled in this way, even if they are commutative and associative. (For example, floating-point min/max is commutative and associative, however if it is required to quieten sNaN representations in memory, then it does not have an identity value.)

In another embodiment therefore, an "uninitialized"-bit (an "invalid" bit) is stored per data item in the temporary cache line when preparing it, instead of an identity-value. (This can be done even where the arithmetic operation has an identity value, if desired.) This comes at the cost of extra storage, but using uninitialized-bits has the advantage that they make it possible to handle atomic operations that do not have identity-values (e.g. Floating-point min/max and Atomic-Swap) in the manner of the technology described herein.

When an atomic operation is to be performed on an "uninitialized" data item in the temporary cache line, the argument value for the atomic memory request in question is stored in the data item in the temporary cache line, and that data item is then flagged as initialized. Subsequent atomic operations on the data item in the temporary cache line (i.e. on "initialised" ("valid") data items) can then be performed in the normal manner, using the value stored in the temporary cache line.

Then when the temporary cache line is to be combined with the incoming "true" cache line from memory (i.e. when the merge operation is performed), the data items in the incoming cache line for any "uninitialized" data items in the temporary cache line are copied across to the "result" cache line unchanged (i.e. any uninitialized data items in the temporary cache line cause the merge operation to just use the corresponding data from the incoming cache line unmodified (i.e. to store the data items in the incoming cache line in the temporary cache line unchanged)).

If uninitialized-bits are used in an arrangement where stalled atomic memory requests have their argument values replaced with the data value read from the temporary cache line, then the value that is read from the temporary cache line and stored with the memory request when it is placed in the stalled memory requests buffer should carry with it the uninitialized-bits.

If all of the atomic operations have sizes that are multiples of an underlying storage unit (such as a byte), it would be possible to provide an uninitialized-bit per storage unit instead of per data item. This will work as long as there exists at least one such bit for each data item in a cache line. In this case, if the temporary cache line is stored in a cache that is already able to track e.g. per-byte dirty-bits, the dirty-bits can be used to provide the uninitialized-bit functionality.

As will be appreciated from the above, after the merge operation has been performed, snoops from other L1 caches may cause the "true" cache line to disappear from the L1 cache before the spooling of the parked memory requests has completed (i.e. such that the old temporary cache line will still be present in the cache). In this case, if a new atomic-request appears for the same memory address, a new temporary cache line for the memory address is in an embodiment allocated, even if old temporary cache line still exists for the same memory address. In this case, any temporary cache line hits should, and in an embodiment do, hit the new temporary cache line, not the old one. To facilitate this, the merging process in an embodiment also modifies the cache line state of the temporary cache line in question so as to prevent getting hits on old temporary cache lines.

In an embodiment, the cache line snoop handling is round-robin (i.e. if cache N holds the line, and all other caches want it, then hand the cache line to cache N+1), or otherwise fair. (However, this is not essential and substantial performance improvement can be achieved even if this kind of fairness guarantee cannot be satisfied.)

The temporary cache line in the above embodiments is tagged with both a memory address and an atomic-operation. As such, if memory accesses are attempted that match the temporary cache line's address but do not match the temporary cache line's atomic-operation, then such memory accesses cannot be accumulated into the temporary cache line. If this situation arises, there are two possible approaches: stall the attempted access until the cache line merging process has been completed for the existing temporary cache line; or allocate an additional temporary cache line for each separate atomic-operation on the memory address. In the latter case, when the external data (cache line) arrives from memory, multiple cache line "merge" operations can then be performed, one for each temporary cache line bound to the memory address. In an embodiment an implementation can select which of these approaches to use for different atomic operations. For example, allocating an additional temporary cache line is likely to be particularly beneficial for atomic min/max operations but not so good for Compare-And-Swap.

It can be seen that in the above embodiments, an L1 cache only actually needs to retain ownership of the cache line during the cache line merging process: as soon as the merging process is complete, the result merged cache line can be handed to another L1 cache. This is the case even if the stalled atomic operations have not been fully processed yet (as after the merging process, the L1 cache contains all the information needed to reconstruct the correct atomic return values even without the result merged cache line).

Furthermore from the point of view of any observer, the atomic operations behave as if all of the atomic operations in the cache line are committed during the merging phase. (For this reason, atomic requests that have committed their atomics against the temporary cache line are withheld in the L1 cache until after the Merge is complete, even if they are of "NoReturn" type (as otherwise, their ordering would become observably nonsequential).)

This is true regardless of the number of atomic operations that have been performed on the temporary cache line. Also, the Merge phase takes constant worst-case time (its running time is proportional to cache line length).

This being the case, if a large number of L1 caches all wish to perform atomic operations on the same memory location, the cache line will constantly be travelling from one L1 cache to another, with each L1 cache subjecting it to a single "merge" pass before immediately passing the line to the next cache. This helps to decouple the globally observed atomic update rate from the atomic update rate internally in an L1 cache. The update rate is then only limited by how quickly the cache line can travel.

This then makes it possible to achieve extremely high observed rates of atomic operation, even if an individual cache cannot sustain a very high atomic rate. For example, in a system with 40 L1 caches, with the ability to transfer a cache line from one cache to another in 20 cycles and the ability to perform a "merge" in 5 cycles, then a cache line can travel from one L1 cache to another at a rate of one L1 cache per 25 cycles. If it is assumed that each L1 cache serves 1000 threads, all of which wish to increment a single counter, then in such a system each L1 cache will track a temporary cache line that stores the cumulative result of 1000 counter increments. When the cache line containing the counter hops around from one cache to another, it will then be able to serve 1000 atomics every 25 cycles, for an observed global increment rate of 40 increments per clock cycle. (This requires each L1 cache to be able to serve 1 atomic-increment per clock internally.)

Furthermore, the present embodiments require only local changes to the L1 caches' operation. Any protocols that the L1 caches use for communicating with their masters and with the memory subsystem (typically a simple request-response protocol for the master and a full coherency protocol for the memory subsystem) are unaffected.

It can be seen from the above that the technology described herein, in its embodiments at least, comprises a mechanism for facilitating the execution of atomic operations in systems with multiple data caches in a more efficient manner.

This is achieved, in the embodiments of the technology described herein at least, by accumulating the results of atomic operations that are to access the same memory location in a temporary cache line pending the arrival in the cache of the "true" cache line from memory, and then combining the accumulated results of the atomic operations stored in the temporary cache line with the "true" cache line from memory when the "true" cache line arrives in the cache. The technology described herein enables accumulation of memory atomic operations, so that when a cache line arrives at a given cache, a full set of accumulated atomics can be committed to the cache line at once.

In embodiments at least, the technology described herein also features a scheme to reconstruct atomic values, in order to produce behavior observably identical to that of having all the atomics performed sequentially.

This is all achieved with changes only to the cache operation with no changes to any other subsystem.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system which includes one or more initiators operable to initiate atomic memory requests for execution threads and one or more data caches that are used to store data needed to perform an atomic memory operation when an atomic memory operation is to be performed, the method comprising:

for a set of one or more execution threads that are each to execute a particular atomic operation against the same memory address one after another, the atomic operation having an associated arithmetic operation:

prior to performing the atomic operation for the first thread in the set, determining whether the data cache that is to store the data needed to perform the atomic operation already stores the data at the memory address that the atomic operation is to be performed against, and if the data cache does not already store that data:

sending a memory request to fetch into the data cache a cache line containing a data item containing the data at the memory address that the atomic operation is to be performed against;

allocating a temporary cache line in the data cache for the atomic operation;

preparing the data items in the temporary cache line for the atomic operation;

causing the operand value to the arithmetic operation for the atomic operation for the first thread in the set to be stored in the data item for the memory address that the atomic operation is to be performed against in the temporary cache line;

if the set of one or more execution threads includes more than one thread, performing the atomic operation for one or more subsequent threads in the set against the data item for the memory address that the atomic operations are to be performed against in the temporary cache line in the data cache in turn, until the cache line containing the data at the memory address that the atomic operation is to be performed against arrives in the data cache; and when the cache line containing the data at the memory address that the atomic operation is to be performed against arrives in the data cache, performing the arithmetic operation for the atomic operation using the data item for the memory address in the temporary cache line as one operand and using the data item for the memory address in the arrived cache line as the other operand, to thereby provide a result data item containing the combined result of the atomic memory operations on the memory address that the atomic operation is to be performed against; and storing a result cache line containing the result data item.

2. The method of claim 1, wherein the set of execution threads include plural execution threads, and the method comprises:

performing the atomic operation for plural threads against the data item for the memory address that the atomic operation is to be performed against in the temporary cache line in the data cache in turn, before the cache line containing the data at the memory address that the atomic operation is to be performed against arrives in the data cache, so as to accumulate the results of the atomic operations for plural execution threads in the temporary cache line before the cache line containing the data at the memory address that the atomic operation is to be performed against arrives in the data cache.

3. The method of claim 1, comprising:

using the same temporary cache line to accumulate the results of atomic operations for two or more different sets of execution threads, each set of execution threads executing a particular atomic operation against a respective different memory address, the atomic operation having an associated arithmetic operation;

and wherein the method comprises:

sending a memory request to fetch into the data cache a cache line containing a respective data item for each set of execution threads, each respective data item containing the data at the memory address that the atomic operation is to be performed against for the set of threads in question;

causing the operand value to the arithmetic operation for the atomic operation for the first thread in each set of threads to be stored in the data item for the respective memory address for the set of threads in question in the temporary cache line;

for each set of one or more execution threads that includes more than one thread, performing the atomic operation for one or more subsequent threads in the set of threads against the data item for the memory address for the set of threads in question in the temporary cache line in the data cache in turn, until the cache line containing the data at the memory addresses that the atomic operations are to be performed against for the sets of threads arrives in the data cache; and when the cache line containing the data at the memory addresses that the atomic operations are to be performed against for the sets of threads arrives in the data cache, performing, for each respective set of threads, the arithmetic operation for the atomic operation for the set of threads using the data item for the memory address for the set of threads in the temporary cache line as one operand and using the data item for the memory address for the set of threads in the arrived cache line as the other operand, to thereby provide a result data item containing the combined result of the atomic memory operations on the memory address that the atomic operation is to be performed against for the set of threads; and storing a result cache line containing the result data items for each set of threads.

4. The method of claim 1, wherein the data processing system has plural initiators, each having a respective data cache.

5. The method of claim 1, wherein the atomic operation comprises one of: Integer Add; Bitwise AND, OR, XOR; Minimum Value; Maximum Value; Saturating unsigned integer add; Integer multiply; floating-point add; floating point multiply; integer add, modulo a constant K; Swap; and Compare-and-Swap.

6. The method of claim 1, wherein each data item in the temporary cache line is prepared by initialising it to an identity value for the arithmetic operation for the atomic operation in question; or each data item in the temporary cache line is prepared by marking it as being uninitialised.

7. The method of claim 1, further comprising accumulating queued atomic memory operations that are to use the same memory address into the temporary cache line, by taking each atomic memory request from the queue and performing it against the temporary cache line in turn, whilst waiting for the requested cache line to arrive in the data cache.

8. The method of claim 1, wherein:

the temporary cache line contains plural data items and each data item in the temporary cache line is prepared by setting it to the identity value for the arithmetic operation; and the step of causing the operand value to the arithmetic operation for the atomic operation for the first thread in a set of threads to be stored in the data item for the memory address that the atomic operation is to be performed against in the temporary cache line for the set of threads comprises: performing the arithmetic operation for the atomic operation for the first thread using the identity value stored in the data item for the memory address that the atomic operation is to be performed against in the temporary cache line and writing the result to the data item for the memory address that the atomic operation is to be performed against in the temporary cache line;

and the method further comprises when the cache line containing the data at the memory address or addresses that the atomic operations are to be performed against arrives in the data cache, combining that cache line with the temporary cache line by performing the arithmetic operation for the atomic operation for each respective pair of data items in the cache lines to provide the result cache line.

9. The method of claim 1, wherein:

the temporary cache line contains plural data items and each data item in the temporary cache line is prepared by marking it as being uninitialised; and the step of causing the operand value to the arithmetic operation for the atomic operation for the first thread in a set of threads to be stored in the data item for the memory address that the atomic operation is to be performed against in the temporary cache line for the set of threads comprises: writing the operand value to the arithmetic operation for the atomic operation for the first thread in the set to the data item for the memory address that the atomic operation is to be performed against in the temporary cache line for the set of threads; and the method comprises then marking the data item in the temporary cache line as being initialised;

and the method further comprises when the cache line containing the data at the memory address or addresses that the atomic operations are to be performed against arrives in the data cache:

for any data items in the temporary cache line that are marked as being initialised, performing the arithmetic operation for the atomic operation using the data item for the memory address in the temporary cache line as one operand and using the data item for the memory address in the arrived cache line as the other operand, to thereby provide the result data item for that memory address; and for any uninitialized data items in the temporary cache line, copying the data items in the incoming cache line to the result cache line unchanged.

10. The method of claim 1, further comprising for a return atomic operation, when the atomic operation is performed against the temporary cache line, not then returning the atomic memory operation for the thread to the initiator, but instead placing the atomic memory operation in a buffer for stalled atomic memory requests.

11. The method of claim 10, further comprising keeping the original argument value for an atomic memory request when it is placed in the stalled requests buffer, or replacing the original argument value for an atomic memory request with the data value read from the temporary cache line when the atomic memory request is placed in the stalled requests buffer.

12. The method of claim 10, further comprising: once the temporary cache line and the requested cache line have been combined to provide the result cache line, then performing any stalled memory requests that relate to the memory address or addresses in question using the data in the memory address or addresses from the requested cache line.

13. The method of claim 10, further comprising tracking for a temporary cache line, which stalled memory requests are awaiting the requested cache line.

14. The method of claim 1, wherein the data processing system comprises a graphics processing system that includes a plurality of graphics processing pipelines that each include one or more programmable shader stages which execute graphics shader programs to perform graphics processing operations.

15. A data processing system comprising:
one or more initiators operable to initiate atomic memory requests for execution threads;
and one or more data caches that are used to store data needed to perform an atomic memory operation when an atomic memory operation is to be performed;
wherein the one or more data caches are configured to, for a set of one or more execution threads that are each to execute a particular atomic operation against the same memory address one after another, the atomic operation having an associated arithmetic operation:
prior to performing the atomic operation for the first thread in the set, determine whether the data cache that is to store the data needed to perform the atomic operation already stores the data at the memory address that the atomic operation is to be performed against, and if the data cache does not already store that data:
send a memory request to fetch into the data cache a cache line containing a data item containing the data at the memory address that the atomic operation is to be performed against;
allocate a temporary cache line in the data cache for the atomic operation;
prepare the data items in the temporary cache line for the atomic operation;
cause the operand value to the arithmetic operation for the atomic operation for the first thread in the set to be stored in the data item for the memory address that the atomic operation is to be performed against in the temporary cache line;
if the set of one or more execution threads includes more than one thread, perform the atomic operation for one or more subsequent threads in the set against the data item for the memory address that the atomic operations are to be performed against in the temporary cache line in the data cache in turn, until the cache line containing the data at the memory address that the atomic operation is to be performed against arrives in the data cache; and
when the cache line containing the data at the memory address that the atomic operation is to be performed against arrives in the data cache, perform the arithmetic operation for the atomic operation using the data item for the memory address in the temporary cache line as one operand and using the data item for the memory address in the arrived cache line as the other operand, to thereby provide a result data item containing the combined result of the atomic memory operations on the memory address that the atomic operation is to be performed against; and
store a result cache line containing the result data item.

16. The system of claim 15, wherein the set of execution threads include plural execution threads, and the one or more data caches are configured to:
perform the atomic operation for plural threads against the data item for the memory address that the atomic operation is to be performed against in the temporary cache line in the data cache in turn, before the cache line containing the data at the memory address that the atomic operation is to be performed against arrives in the data cache, so as to accumulate the results of the atomic operations for plural execution threads in the temporary cache line before the cache line containing the data at the memory address that the atomic operation is to be performed against arrives in the data cache.

17. The system of claim 15, wherein the one or more data caches are configured to:
use the same temporary cache line to accumulate the results of atomic operations for two or more different sets of execution threads, each set of execution threads executing a particular atomic operation against a respective different memory address, the atomic operation having an associated arithmetic operation;
and to, when using the same temporary cache line to accumulate the results of atomic operations for two or more different sets of execution threads:
send a memory request to fetch into the data cache a cache line containing a respective data item for each set of execution threads, each respective data item containing the data at the memory address that the atomic operation is to be performed against for the set of threads in question;
cause the operand value to the arithmetic operation for the atomic operation for the first thread in each set of threads to be stored in the data item for the respective memory address for the set of threads in question in the temporary cache line;

for each set of one or more execution threads that includes more than one thread, perform the atomic operation for one or more subsequent threads in the set of threads against the data item for the memory address for the set of threads in question in the temporary cache line in the data cache in turn, until the cache line containing the data at the memory addresses that the atomic operations are to be performed against for the sets of threads arrives in the data cache; and when the cache line containing the data at the memory addresses that the atomic operations are to be performed against for the sets of threads arrives in the data cache, perform, for each respective set of threads, the arithmetic operation for the atomic operation for the set of threads using the data item for the memory address for the set of threads in the temporary cache line as one operand and using the data item for the memory address for the set of threads in the arrived cache line as the other operand, to thereby provide a result data item containing the combined result of the atomic memory operations on the memory address that the atomic operation is to be performed against for the set of threads; and store a result cache line containing the result data items for each set of threads.

18. The system of claim 15, wherein the data processing system has plural initiators, each having a respective data cache.

19. The system of claim 15, wherein the atomic operation comprises one of: Integer Add; Bitwise AND, OR, XOR; Minimum Value; Maximum Value; Saturating unsigned integer add; Integer multiply; floating-point add; floating point multiply; integer add, modulo a constant K; Swap; and Compare-and-Swap.

20. The system of claim 15, wherein each data item in the temporary cache line is prepared by initialising it to an identity value for the arithmetic operation for the atomic operation in question; or each data item in the temporary cache line is prepared by marking it as being uninitialised.

21. The system of claim 15, wherein the one or more data caches are configured to accumulate queued atomic memory operations that are to use the same memory address into a temporary cache line, by taking each atomic memory request from the queue and performing it against the temporary cache line in turn, whilst waiting for the requested cache line to arrive in the data cache.

22. The system of claim 15, wherein:
the temporary cache line contains plural data items and each data item in the temporary cache line is prepared by setting it to the identity value for the arithmetic operation; and
the one or more data caches are configured to:
cause the operand value to the arithmetic operation for the atomic operation for the first thread in a set of threads to be stored in the data item for the memory address that the atomic operation is to be performed against in the temporary cache line for the set of threads by performing the arithmetic operation for the atomic operation for the first thread using the identity value stored in the data item for the memory address that the atomic operation is to be performed against in the temporary cache line and writing the result to the data item for the memory address that the atomic operation is to be performed against in the temporary cache line; and to
when the cache line containing the data at the memory address or addresses that the atomic operations are to be performed against arrives in the data cache, combine that cache line with the temporary cache line by performing the arithmetic operation for the atomic operation for each respective pair of data items in the cache lines to provide the result cache line.

23. The system of claim 15, wherein:
the temporary cache line contains plural data items and each data item in the temporary cache line is prepared by marking it as being uninitialised; and
the one or more data caches are configured to:
cause the operand value to the arithmetic operation for the atomic operation for the first thread in a set of threads to be stored in the data item for the memory address that the atomic operation is to be performed against in the temporary cache line for the set of threads by writing the operand value to the arithmetic operation for the atomic operation for the first thread in the set to the data item for the memory address that the atomic operation is to be performed against in the temporary cache line for the set of threads; and to then mark the data item in the temporary cache line as being initialised;
and the one or more data caches are further configured to, when the cache line containing the data at the memory address or addresses that the atomic operations are to be performed against arrives in the data cache:
for any data items in the temporary cache line that are marked as being initialised, perform the arithmetic operation for the atomic operation using the data item for the memory address in the temporary cache line as one operand and using the data item for the memory address in the arrived cache line as the other operand, to thereby provide the result data item for that memory address; and
for any uninitialized data items in the temporary cache line, copy the data items in the incoming cache line to the result cache line unchanged.

24. The system of claim 15, wherein the one or more data caches are configured to for a return atomic operation, when the atomic operation is performed against the temporary cache line, not then return the atomic memory operation for the thread to the initiator, but instead place the atomic memory operation in a buffer for stalled atomic memory requests.

25. The system of claim 24, wherein the one or more data caches are configured to keep the original argument value for an atomic memory request when it is placed in the stalled requests buffer, or to replace the original argument value for an atomic memory request with the data value read from the temporary cache line when the atomic memory request is placed in the stalled requests buffer.

26. The system of claim 24, wherein the one or more data caches are configured to once the temporary cache line and the requested cache line have been combined to provide the result cache line, then perform any stalled memory requests that relate to the memory address or addresses in question using the data in the memory address or addresses from the requested cache line.

27. The system of claim 24, wherein the one or more data caches are configured to track for a temporary cache line, which stalled memory requests are awaiting the requested cache line.

28. The system of claim 15, wherein the data processing system comprises a graphics processing system that includes a plurality of graphics processing pipelines that each include one or more programmable shader stages which execute graphics shader programs to perform graphics processing operations.

29. A computer readable storage medium storing computer software code which when executing on a processor performs a method of operating a data processing system which includes one or more initiators operable to initiate atomic memory requests for execution threads and one or more data caches that are used to store data needed to perform an atomic memory operation when an atomic memory operation is to be performed, the method comprising:

for a set of one or more execution threads that are each to execute a particular atomic operation against the same memory address one after another, the atomic operation having an associated arithmetic operation:

prior to performing the atomic operation for the first thread in the set, determining whether the data cache that is to store the data needed to perform the atomic operation already stores the data at the memory address that the atomic operation is to be performed against, and if the data cache does not already store that data:

sending a memory request to fetch into the data cache a cache line containing a data item containing the data at the memory address that the atomic operation is to be performed against;

allocating a temporary cache line in the data cache for the atomic operation;

preparing the data items in the temporary cache line for the atomic operation;

causing the operand value to the arithmetic operation for the atomic operation for the first thread in the set to be stored in the data item for the memory address that the atomic operation is to be performed against in the temporary cache line;

if the set of one or more execution threads includes more than one thread, performing the atomic operation for one or more subsequent threads in the set against the data item for the memory address that the atomic operations are to be performed against in the temporary cache line in the data cache in turn, until the cache line containing the data at the memory address that the atomic operation is to be performed against arrives in the data cache; and when the cache line containing the data at the memory address that the atomic operation is to be performed against arrives in the data cache, performing the arithmetic operation for the atomic operation using the data item for the memory address in the temporary cache line as one operand and using the data item for the memory address in the arrived cache line as the other operand, to thereby provide a result data item containing the combined result of the atomic memory operations on the memory address that the atomic operation is to be performed against; and storing a result cache line containing the result data item.

* * * * *